US012801664B1

(12) United States Patent
Eckhouse et al.

(10) Patent No.: US 12,801,664 B1
(45) Date of Patent: Nov. 17, 2026

(54) TECHNIQUES FOR GENERATING CONTENT SEGMENT PLAYLISTS

(71) Applicant: Amazon Technologies, Inc., Seattle, WA (US)

(72) Inventors: Justin Eckhouse, Oakland, CA (US); Apoorva Tyagi, Los Angeles, CA (US); Mari Joller, New York, NY (US); Martin Kruusimagi, Tallinn (EE); Marek Kikas, Tallinn (EE); Ottokar Siirak, Tallinn (EE); Michael James Shobe, Croton-on-Hudson, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/750,578

(22) Filed: Jun. 21, 2024

(51) Int. Cl.

| | |
|---|---|
| ***G06F 17/00*** | (2019.01) |
| ***G06F 7/00*** | (2006.01) |
| ***G06F 16/638*** | (2019.01) |
| ***G06F 40/40*** | (2020.01) |
| ***G10L 13/08*** | (2013.01) |
| *G06F 3/16* | (2006.01) |

(52) U.S. Cl.
CPC ............ *G06F 16/639* (2019.01); *G06F 40/40* (2020.01); *G10L 13/08* (2013.01); *G06F 3/165* (2013.01)

(58) Field of Classification Search
CPC ........ G06F 16/639; G06F 40/40; G06F 3/165; G10L 13/08
USPC .......................................................... 707/722
See application file for complete search history.

(56) References Cited

U.S. PATENT DOCUMENTS

| | | | | |
|---|---|---|---|---|
| 10,223,438 | B1 * | 3/2019 | Xu | G06F 16/955 |
| 2007/0106660 | A1 * | 5/2007 | Stern | G06F 16/739 707/999.005 |
| 2007/0106693 | A1 * | 5/2007 | Houh | G06F 16/78 707/E17.02 |
| 2015/0279390 | A1 * | 10/2015 | Mani | G06F 16/345 704/235 |
| 2019/0027188 | A1 * | 1/2019 | Akolkar | G06F 18/2325 |
| 2020/0105274 | A1 * | 4/2020 | Joller | G10L 25/63 |
| 2022/0139398 | A1 | 5/2022 | Joller et al. | |
| 2023/0005497 | A1 * | 1/2023 | Zhu | G06F 40/30 |

* cited by examiner

*Primary Examiner* — Pavan Mamillapalli
(74) *Attorney, Agent, or Firm* — Kilpatrick Townsend & Stockton LLP

(57) ABSTRACT

Techniques are described herein for generating content segment playlists that include content segments that correspond to a sub-portion of longer content. Segments can be grouped by topic or any suitable segment attribute. Transitions to be utilized before or after playback of a content segment and/or content segment playlist may be generated using a transcription of the content segment (or multiple content segments) as input to a large language model, the output of which may be provided to a generative audio system configured to generate speech from text. The audio version of the transition may be paired with the segment or playlist to which it correspond and added to a content segment playlist. The playlist may be presented at a user interface to enable users to discover new audio content and to engage in audio content in a new way. The playlist may be subsequently updated without further user interaction.

20 Claims, 10 Drawing Sheets

300

400

900

1000

TECHNIQUES FOR GENERATING CONTENT SEGMENT PLAYLISTS

BACKGROUND

There has been shift in consumption patterns from long-form content to short-form content. Video-based reels and shorts have seen rapid growth. However, many audio content formats, such as podcasts, may be relatively long in duration, which may dissuade users from engaging with the content. Some users can get overwhelmed when searching due to the lack of available information about the content, making it difficult to ascertain whether they would find the content interesting enough to warrant engagement. For these and other reasons, conventional systems make it difficult for users to find audio content that relates to topics in which the user has interest without expending a relatively large amount of time and effort. The techniques disclosed herein are directed to improving the ability for a user to discover content in which they have interest, while reducing or even eliminating the amount of time traditionally required for manual searching.

BRIEF DESCRIPTION OF THE DRAWINGS

Various embodiments in accordance with the present disclosure will be described with reference to the drawings, in which.

DETAILED DESCRIPTION

Figure 1:
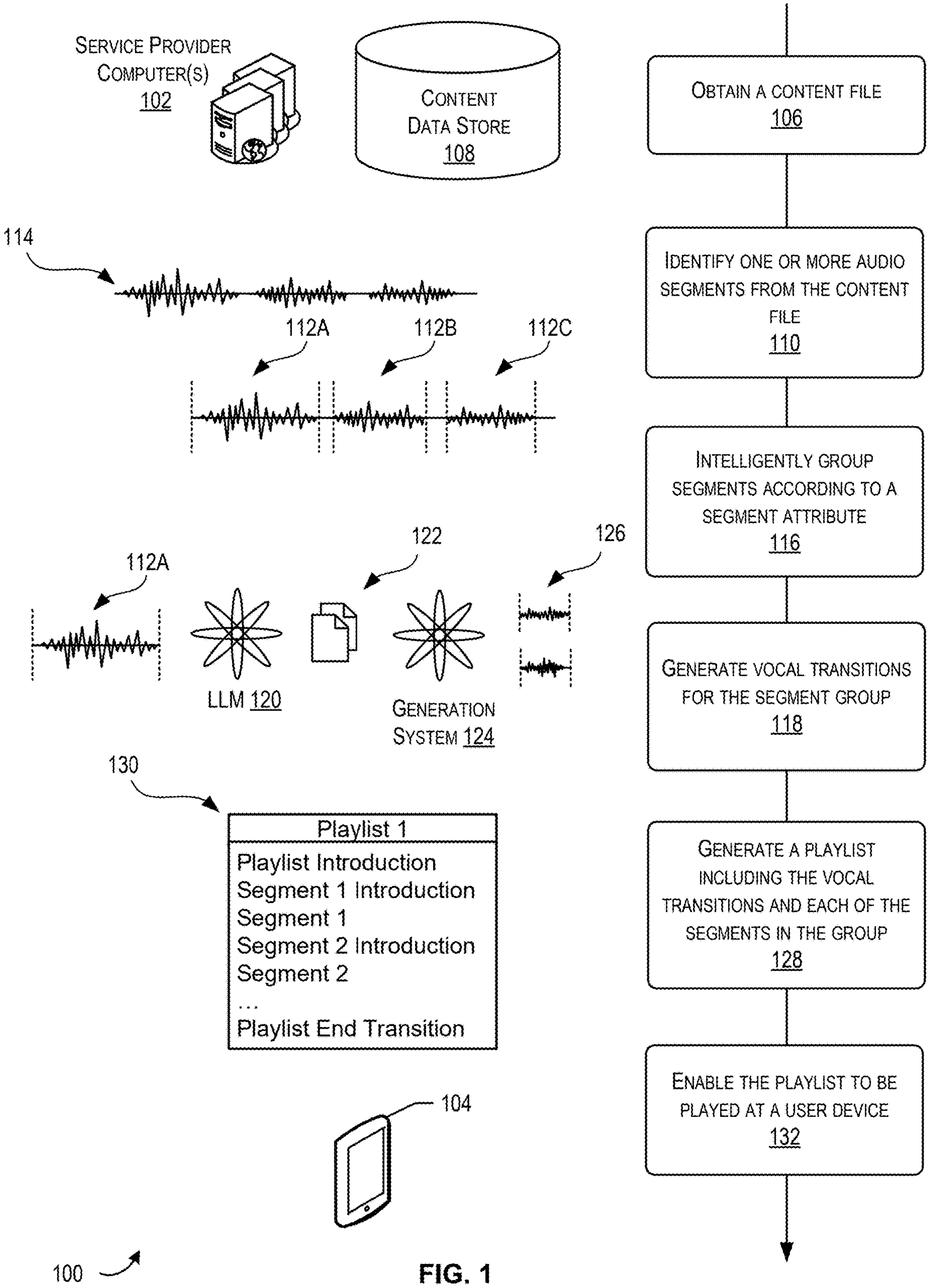
FIG. 1 is a flow diagram illustrating an exemplary method for generating a content segment playlist, in accordance with at least one embodiment.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Audio content (e.g., podcasts, radio shows, and the like) can be often more difficult to search or browse than other content types (e.g., text, images, shorts/videos, etc.). Additionally, many forms of audio content can be relatively long in duration, which dissuades some users from engaging in the content. Previous attempts to shorten audio content to a form that is more easily consumed have typically required human curators to listen through the entire content to manually identify the sub-portion(s) to be used to generate shorter-form content segments. However, even these shorter-form audio content segments lack information and searchability. Conventional systems that are configured to generate these types of shorter audio segments from longer audio content, typically require human interaction for content creation, resulting in undue delay in the content production process. Conventional techniques also fail to improve the discoverability of these segments, largely requiring the user to perform a manual searching process to find content of interest.

Techniques described herein are directed to improving a user's ability to discover content in which they may have interest. Content segments (e.g., audio or video content segments) may be automatically generated by the system from a longer content file (e.g., an audio or video file) in an intelligent manner, to produce audio content segments that are shorter and therefore easier to consume, relate to an identifiable topic, and have a natural start and end, making them ideal to be used as stand-alone content. Content segments (sometimes referred to as "content bites") may be aggregated together, by topic, based on viewing history indicating popular segments, or based on any suitable common or related segment attribute. Textual informative transitions (e.g., an introduction, an ending transition, etc.) may be generated for each segment and/or the playlist by a large language model (LLM), based on segment metadata provided as input. The textual output of the LLM can be provided to a generative system that may be configured to generate voice (or video with an audio component) from text to convert these informative transitions to an asset with an audio component (e.g., an audio or video asset).

The transitions and content bites can be stitched together to form a content bite playlist (also referred to as an "content segment playlist") which can be presented at a user device for playback. During playback, the content of the playlist may be played sequentially to introduce the playlist, introduce each segment prior to playback of the segment, and to end each segment playback with a transition that includes information (e.g., instructions for navigating to related content). The user may skip ahead or navigate at will to different segments of the playlist, or to related content such as the full content from which a segment was generated. These playlists can be dynamically updated by the system as new content becomes available. In some embodiments, the playlists can be customized to each user based on topics the user has explicitly identified interest in and/or based on inferring interest through historical viewing data and/or purchase history, based on the viewing and/or purchase patterns of similar users, or the like.

Unlike conventional systems that require users to perform manual searches for content, the disclosed techniques enable users to consume and discover new short-form content more easily, with relatively no manual effort. The user could be connected to new and interesting content in a hands-free fashion while on the go, commuting, running errands, walking their dog, and the like. Audio content segments can be automatically and intelligently generated, categorized, grouped by topic or by another suitable attribute, and augmented to provide the user with information of how to reach similar and/or related content. User interfaces may provide options to navigating the user to the full content and/or a page dedicated to the source of the content (e.g., a news radio station, a comedian, a tv show, etc.). Users can be notified when playlists are dynamically updated/replaced to provide new content. Future playlists may be personalized based on past consumption patterns or patterns of similar users to enable the system to match playlists to users that are likely to find the content interesting. These techniques, separately and in combination, reduce the time and effort required for the user to discover and/or access content in which they have interest, improving the user's experience over previous techniques, and reducing wasteful processing inherent in conventional systems through reducing, if not eliminating, the need for users to conduct manual searches for content. By reducing the need for users to perform manual searches, the disclosed systems may process less network traffic than previous systems that required such searches, allowing the disclosed system to utilize processing resources for other purposes.

Although examples herein utilize audio content to create playlists of audio content segments, it should be appreciated that similar techniques may be utilized for other types of content. The techniques discussed herein may be utilized for any suitable modality. By way of example, the techniques provided herein may be utilized to generate video and/or audio content segments from video content. Playlists may be created for video segments generated from video content (e.g., video content that may, or may not, include an audio component) in a similar manner as discussed herein with respect to audio segments and audio content. In some embodiments, playlists may include any suitable mix of content such as video content segments (with or without an audio component) and/or audio content segments. The introductions and/or ending transitions generated for segments and/or playlists may similarly include any suitable combination of video and/or audio.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which is a flow diagram illustrating an exemplary method 100 for generating a content segment playlist, in accordance with at least one embodiment. The operations may be performed with a service provider computer (e.g., service provider computer(s) 102). The content segment playlist (a "content bite playlist") may be presented at user device 104 which can be any suitable user device. More or fewer operations may be included in method 100 than the ones depicted in FIG. 1 and the operations may be performed in any suitable order, not necessarily the order provided in FIG. 1.

The method 100 may begin at 106, where a content file may be obtained. In some embodiments, the content file may be audio content or video content. "Audio content," as used herein, is intended to refer to audio files of at least a threshold duration (e.g., 10 minutes or longer, 15 minutes or longer, etc.) and/or original content from which one or more audio segments (also referred to herein as "audio content segments") can be derived/identified. Examples of audio content can include, but are not limited to, podcasts, Internet radio/radio shows, audiobooks, audio blogs, streamed audio, and the like. "Video content," as used herein, is intended to refer to video files having at least a threshold duration (e.g., 10 minutes or longer, 15 minutes or longer, etc.) and/or original content from which one or more video segments (also referred to herein as "video content segments") can be derived/identified. Examples of video content may include, but are not limited to, video recorded lectures, video-based interviews, video-based radio shows, movies, television shows, streamed video, and the like. Generally, the terms "content segments" and "segments" are intended to audio or video content segments obtained from audio content and video content, respectively. In some embodiments, the content file may be obtained from content data store 108, a data store configured to store audio and/or video files and accessible to the service provider computer(s) 102.

At 110, the service provider computer(s) 102 may identify one or more content segments (e.g., content segments 112A, 112B, and 112C, collectively referred to as "content segments 112") may be identified from content 114 (e.g., an instance of content retrieved from content data store 108). As a non-limiting example, content segments 112 may each correspond to a sub-portion of content 114 which may be audio content such as a full podcast. As another non-limiting example, content segments 112 may each correspond to a sub-portion of content 114, which in some examples, is a video-based interview. A process for generating shorter content segments 112 from longer original content is discussed in further detail with respect to FIG. 3. During generation, metadata/segment attributes may be extracted/derived from the content segment including, but not limited to: a transcription of the audio (or audio component in video examples), a title (e.g., a segment specific title and/or a title associated with the audio content from which the segment was derived), a description (e.g., a segment specific description and/or a description associated with the content from which the segment was derived), a source identifying the content from which the segment was derived and/or a source of that content, a segment duration, a number of speakers, a type of speakers, one or more speaker identifiers indicating particular speakers in the segment, one or more topic identifiers indicating one or more topics to which the segment relates, a segment type (e.g., podcast, radio show, etc.), audio features (e.g., pauses, vocal volume, vocal pitch, vocal timber, vocal emotion, vocal emphasis, vocal patterns, etc.), keywords, phrases, semantic relations, names, or the like. In some embodiments, an content segment may be assigned a unique identifier (e.g., a segment identifier) that uniquely identifies that segment.

At 116, service provider computer(s) 102 may intelligently group segments according to any suitable combination of one or more segment attributes (e.g., by speaker, by topic, by keyword, by phrases, by creation and/or publication timestamp, etc.). By way of example, segments derived from various audio content instances may be grouped together based on individually being associated with a common topic. As another example, segments derived from various video content instances may be grouped together based at least in part on one or more segment attributes (e.g., topic, title, timestamp, etc.). In some embodiments, a content segment playlist may include more than one type of content. For example, a content segment playlist could include audio and video segments grouped by one or more common segment attributes. These segments may be made accessible for viewing as stand-alone content at any suitable time. In some embodiments, these segments may be grouped based at least in part on access history (e.g., number of listeners/accesses total, number of listeners/accesses in the last 24 hours, etc.). As a non-limiting example, segments may be grouped based at least in part on being identified as a "popular" segment through an association with at least a threshold number of listeners and/or accesses (e.g., 1,000 listeners, 100,000 accesses, etc.).

In some embodiments, service provider computer(s) 102 may intelligently group segments according to related segment attributes. By way of example, a predefined knowledge base may be accessed to identify predefined relationships between segment attributes (e.g., related topics such as "pizza" and "Italian cuisine"). Topic relatedness may additionally, or alternatively, be identified (and a corresponding association maintained) based on determining two topic identifiers appear together (e.g., in various segment descriptions) over a predefined threshold number of times. As another non-limiting example, any suitable combination of segment attributes of a segment may be used to generate an embedding (e.g., a numerical representation of that data). This embedding (e.g., generated with an autoencoder, a neural network, or the like) may be compared to embeddings of other segments and grouped with segments when the comparison indicates a similarity that breaches a predefined threshold value (e.g., 80% similar, 90% similar, etc.). As a non-limiting example, the title and/or a description associated with a first segment may be provided to a neural network to generate a first embedding. Similarly, the title and/or description associated with a second segment may be provided to the neural network to produce a second embedding. The first and second embeddings may be compared (e.g., via cosine similarity, though flattening the embedding and calculating the dot product of the two flattened embeddings, etc.) and an output indicating a degree of similarity may be generated. If the output is greater than a predefined threshold, the segments may be deemed to be related and the service provider computer(s) 102 may group the two segments in a content segment playlist.

In some embodiments, an operator may utilize one or more provided use interfaces to associate one or more segments with an attribute that may be used by the system to group the segments at any suitable time. As another example, segments derived from audio content instances may be manually grouped within a playlist based at least in part on user input that indicates the specific segments that are to be grouped. An operator may similarly group video content instances within a playlist based on user input. Thus, in some embodiments, the system (including service provider computer(s) 102) may group segments automatically and/or user input may be utilized to select segments with which a group of segments is formed. A portion of the group may be selected by the system and another portion of the same group may be selected based at least in part on user input. By way of example, a set of segments (audio and/or video) may be selected by the system based at least in part on a timestamp and/or number of accesses, indicating a set of new segments that have at least a threshold number of accesses. This set of segments may be presented at a user interface at any suitable time. A user may select additional segments to add to the group via the same user interface. This enables a group of segments to be selected in a partially automated, partially manual manner. In some embodiments, segments that are grouped by the system or according to user input may be reviewed and/or modified. For example, user input may be provided indicating that one or more of the grouped segments is to be removed from the group. In general, system and/or manually generated segment groupings may be user modifiable at any suitable time.

At 118, one or more audio and/or video transitions (e.g., introductions, ending transitions, etc.) may be generated for the segment group. By way of example, content segment 112A may be selected for a group of segments (e.g., a group of segments, each being associated with the topic "baseball"). The content segment 112A and/or any suitable portion of the metadata associated with content segment 112A (e.g., a transcription of the audio of content segment 112A, one or more segment attributes, etc.) may be provided to a large language model (LLM) 120 as input. A "large language model" (LLM), is intended to refer to any suitable deep learning algorithm (e.g., recurrent neural networks, convolutional neural networks, etc.) that can perform various natural language processing (NLP) tasks. LLMs are trained with large datasets, enabling them to recognize, translate, predict, or generate text or other content in a variety of contexts. Some example LLMs include Titan Text G1 Express, Titan Text G1 Lite, Claude, Claude Instant, Jurassic-2 Mid, Jurassic-2 Ultra, Command, Command Light, Llama 2 Chat 13B, Llama 2 Chat 70B, etc. An LLM can be used to perfom any suitable natual language processing or natural language generation task.

The LLM 120 may be used to generate a textual introduction for each segment of the group. In some embodiments, any suitable metadata (e.g., an audio transcription, a title, a description, an audio source, etc.) associated with the segment may be provided to the LLM 120 as input. The LLM 120 may be configured to generate an introduction to the segment based on the provided input. In some embodiments, the introduction may identify any suitable combination or portion of the title, the description, the audio content from which the segment was derived, a source of the audio content, one or more speakers in the segment, or any suitable metadata associated with the segment. As a non-limiting example, a textual version of an introduction may include "up next, you'll hear Jane Doe's interview of Dr. Holland regarding his most recent Mars research."

In some embodiments, the LLM 120 may be configured to generate ending transitions for each segment based on any suitable segment metadata provided as input. By way of example, a textual version of an ending transition may include "You just heard Jane Doe's interview of Dr. holland regarding his most recent Mars research, you can hear the full episode at Jane Doe's podcast page."

In some embodiments, metadata for each segment in the group may be provided to the LLM 120 to generate an introduction for the group. An example group introduction (later herein referred to as a "playlist introduction") may include "Please enjoy this playlist covering various topics on Mars." Similarly, metadata for each segment in the group may be provided to the LLM 120 to generate an ending transition for the group (later herein referred to as a "playlist ending transition"). An example ending transition for the group may include "that's all for now. Thanks for listening and we hope you are enjoying your dynamic playlist. Come back tomorrow for new content about Mars!"

Textual transitions 122 (e.g., segment/playlist introductions, segment/playlist ending transitions) generated by LLM 120 may be provided to generation system 124 as input. Generation system 124 may be any suitable system configured to generate audio and/or video output, generally, or from text, including but not limited to text-to-speech models/system, voice generators, voice narration software, video generators, or the like. The output of generation system 124 may include segments 126, which may include vocal recitations of the textual transitions 122 generated by the LLM 120.

At 128, content segment playlist 130 may be generated by service provider computer(s) 102. As depicted in FIG. 1, content segment playlist 130 may include any suitable combination of the segments grouped at 116 and the segments 126 that provide introductions and/or ending transitions to the segments of the playlist or the playlist as a whole. As a non-limiting example, the content segment playlist 130 may include a playlist introduction, introductions for each segment, and a playlist end transition.

At 132, the service provider computer(s) 102 may enable the playlist to be played at a user device (e.g., user device 104). This may include transmitting data corresponding to the playlist to the user device 104 (or stored such information at a location accessible to the user device 104) for presentation at a user interface. Example user interfaces are discussed in more detail with respect to FIGS. 5 and 6. These user interfaces enable the user to play, pause, and navigate playback of the segments of the playlist, navigate to the sources of these segments, follow a playlist (to be notified of future changes to that playlist), follow an audio source (e.g., a particular radio show, etc.), or the like.

Figure 2:
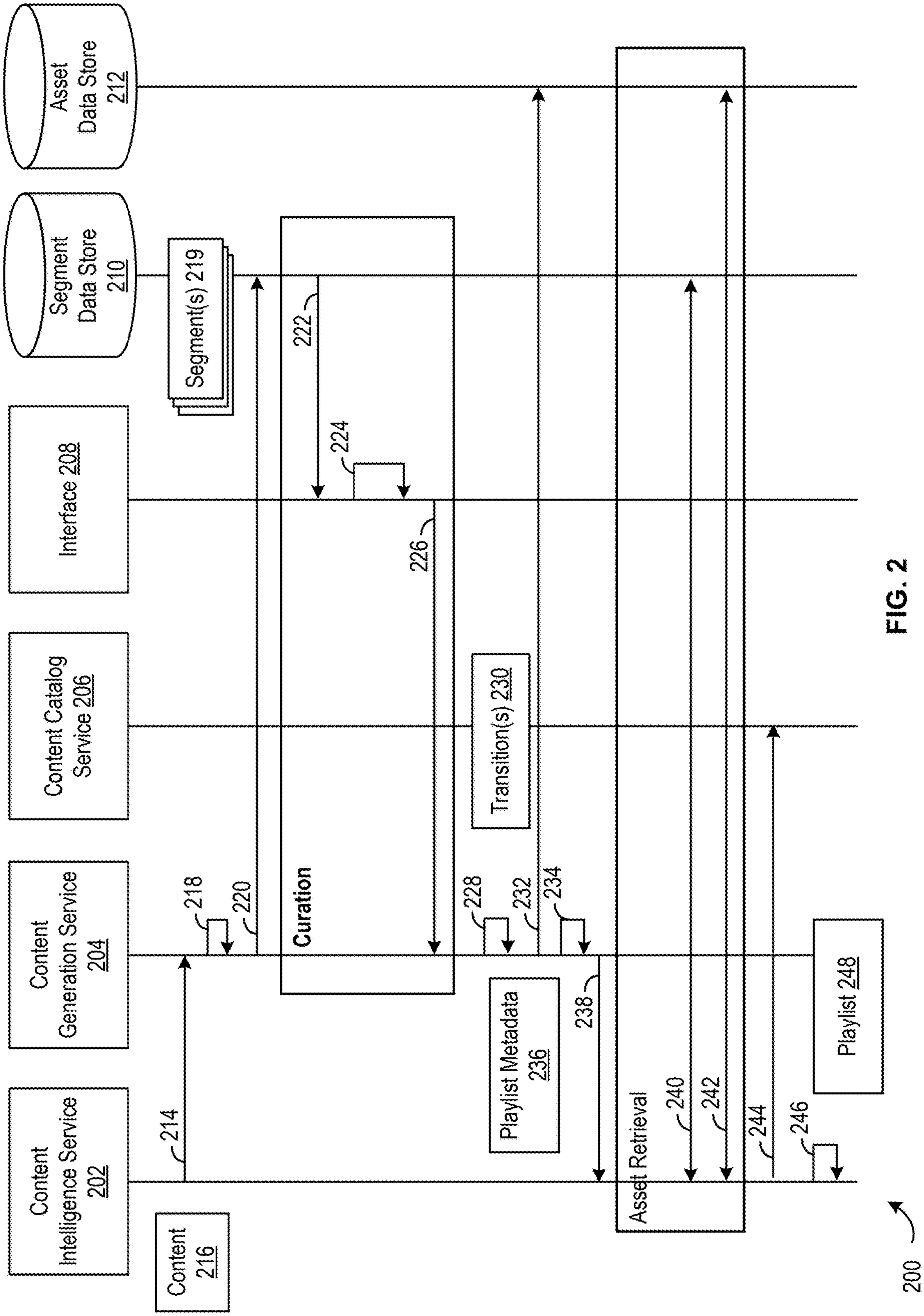
FIG. 2 is a flow diagram illustrating exemplary component interactions for generating an audio content segment playlist, in accordance with at least one embodiment.

FIG. 2 is a flow diagram 200 illustrating exemplary component interactions for generating an audio content segment playlist (a "playlist," for brevity), in accordance with at least one embodiment. The computing components involved in these interactions may include content intelligence service 202, content generation service 204, content catalog service 206, interface 208, segment data store 210, and asset data store 212. In some embodiments, any suitable portion of components 202-212 may be provided by the service provider computer(s) 102 of FIG. 1. The functionality of these computing components may be combined in any suitable manner and performed by fewer computing components than depicted in FIG. 2, or some of the functionality described in connection with FIG. 2 may be provided by different systems not depicted in FIG. 2. Although the example provided in connection with FIG. 2 utilizes audio content, it should be appreciated that these techniques may be similarly applied to content of a different modality (e.g., video content).

The flow may begin at 214, where content intelligence service 202 may send a request to content generation service 204 to generate one or more audio content segments from content 216. In some embodiments, the request may include content 216 or the request may identify content 216 and/or a location from which content generation service 204 may access content 216.

At 218, content generation service 204 may generate one or more audio content segments (e.g., segment(s) 219) from content 216. An example method for generating these audio content segments is discussed in detail with respect to FIG. 3 and is not repeated here for brevity. In some embodiments, generating the audio content segment(s) may include generating corresponding metadata for those segments. Example metadata may include, but is not limited to: a transcription of the audio, a title (e.g., a segment specific title and/or a title associated with the audio content from which the segment was derived), a description (e.g., a segment specific description and/or a description associated with the audio content from which the segment was derived), an audio source identifying the audio content from which the segment was derived and/or a source of that audio content, a segment duration, a number of speakers, a type of speakers, one or more speaker identifiers indicating particular speakers in the audio segment, one or more topics to which the segment relates, a segment type (e.g., podcast, radio show, etc.), audio features (e.g., pauses, vocal volume, vocal pitch, vocal timber, vocal emotion, vocal emphasis, vocal patterns, etc.), keywords, phrases, semantic relations, names, or the like. In embodiments in which video content is used to generate content segments, the metadata may further include video features, objects detected, frame metadata, lighting, visual transitions, or any suitable attribute associated with a video.

At 220, content generation service 204 may transmit segment(s) 219 and any suitable corresponding metadata to segment data store 210 for subsequent use. In some embodiments, segment(s) 219 may be indexed and retrievable with any suitable portion of the segment metadata. As a non-limiting example, segment(s) 219 may individually be indexed/associated with a title, one or more topics, one or more speaker identifiers, a segment type, one or more keywords, and one or more phrases.

In some embodiments, a playlist may be machine-generated (e.g., by the content generation service 204). Optionally, a manual curation process may be utilized. The manual curation process include utilizing interface 208 at 222 to access/retrieve and present any suitable data identifying the segments or metadata stored in segment data store 210, including segment(s) 219. In some embodiments, interface 208 may provide the ability for a user to listen any suitable number of segment(s) 219. In some embodiments, interface 208 may be configured to present any suitable content (e.g., content from content data store 106 of FIG. 1) in order to request one or more segments be generated from specific content. In some embodiments, interface 208 may be configured to provide options for a user to designate a topic (or any suitable metadata such as title, description, keywords, or the like) to be associated with the segment and/or the playlist.

In some embodiments, a curator (or any suitable user) may be provided the ability to conduct a search for segments. As a non-limiting example, a query may be entered via a user interface and used to conduct a search against the metadata associated with previously stored segments. In some embodiments, any suitable portion of the metadata of each segment may be used to generate an segment embedding (e.g., a vector representation of the selected metadata associated with a segment). The segment embedding may be generated based at least in part on provided the desired portion of the segment metadata to an autoencoder, a neural network, or the like. The embedding for each segment may be stored and an association between the embedding and the corresponding segment may be maintained. A query provided via the user interface may similarly be used to generate an embedding (e.g., a "query embedding" that is a vector representation of the query). A vector search may be conducted using the query embedding in which segment embeddings that are identified as having over a threshold degree of similarity to the query embedding may be selected as search results. The curator/user may be provided the ability to generate a content segment playlist from any suitable portion of the search results (e.g., the top 10 segments of the search results, all of the segments of the search results, a number of segments selected by the user from the search results, etc.).

At 224, interface 208 may receive user input identifying a set of segments to be included in an audio content segment playlist. The user input may additionally provide metadata such as a title for the playlist, a description for the playlist, options indicating whether introductions and/or ending transitions are desired for the segments and/or playlist, or the like. The user input may be transmitted to content generation service 204 at 226. In some embodiments, the user input provided at interface 208 may serve as a request to generate one or more segments from specified content. In these cases, the content generation service 204 may perform the operations discussed above at 218 and 220 to generate and store segments generated from the content specified in the user input received.

At 228, content generation service 204 may identify segments to be included in a playlist and may generate corresponding transition(s) 230. The particular segments to be included in the playlist may be determined from user input provided at 226, or the content generation service 204 may identify the segments (e.g., including at least one of the segment(s) 219) to be included in a playlist based at least in part on a predefined rule set. By way of example, content generation service 204 may be configured to search segment data store 210 for segments that are associated with a common topic or other suitable metadata and may group the segments identified based on that association. In some embodiments, the identified segments may be ordered and prioritized based on relevancy to the search query. All the identified segments may be utilized, or a subset may be determined (e.g., based on keeping under a predefined maximum playlist duration, a maximum number of segments, etc.). Transition(s) 230 may include any suitable combination of an introduction for a playlist, an introduction for one or more segments (e.g., all, or some portion of the identified segments, an ending transition for a playlist, or an ending transition for a segment. As described above in connection with FIG. 1, textual versions of transition(s) 230 may be generated by a large language model (e.g., LLM 120 of FIG. 1) and converted to audio using a generative audio system (e.g., audio generation system 124 of FIG. 1). A method for generating transition(s) 230 is discussed in more detail with respect to FIG. 4 and is not repeated here for brevity.

At 232, content generation service 204 may transmit the transition(s) 230 to asset data store 212 for storage and subsequent use.

At 234, content generation service 204 may generate playlist metadata 236. In some embodiments, playlist metadata 236 may identify or otherwise specify the segments and transition(s) 230 included in the playlist. Playlist metadata 236 may include any suitable combination of a playlist identifier, identifiers for any suitable number of segments, identifiers for any suitable number and type of transitions, a playlist title, a playlist description, a publication status, a segment mapping indicating an order by which the segments and/or transitions are to be played, a storage location at which the playlist is to be persisted, a duration of the playlist, or the like. The transition(s) 230 and segments may be sequentially ordered within playlist metadata 236 (e.g., using a mapping, an ordered list, or the like) such that playlist content is ordered in the following order: playlist introduction, segment introduction, segment, segment ending transition, playlist ending transition, where any suitable number of instances of segment introduction, segment, and segment ending transition may be repeated any suitable number of times (e.g., corresponding to the number or some subset of the segments included in the playlist). It should be appreciated that some playlists may not include each of the transitions listed above. For example, a playlist could include a playlist introduction and introductions for each segment, but not include segment ending transitions or a playlist ending transition. As another example, a playlist could include a playlist introduction, a playlist ending transition, and introductions for each of the segments of the playlist. In some embodiments, the particular transition(s) generated by content generation service 204 may depend on a predefined rule set or the particular transition(s) to be generated may be specified in the user input provided at 226.

At 238, content generation service 204 may transmit playlist metadata 236 to content intelligence service 202. In some embodiments, playlist metadata 236 includes identifiers for the transition(s) 230 and segments of the playlist and not the actual segment(s) and/or transition(s) 230.

If segment(s) and/or transition(s) 230 are identified but not provided at 238, the content intelligence service 202 may be configured to perform one or more asset retrieval processes. For example, at 240, the content generation service 204 may perform a process for retrieving the segment(s) identified at 238. At 242, the content generation service 204 may perform a process for retrieving assets from asset data store 212. This may include the transition(s) 230 or any suitable data such as images, artwork, logos and the like corresponding to the audio content and/or the segment(s). In some embodiments, the processes performed at 240 and 242 may be performed in parallel or sequentially. In some embodiments, the content intelligence service 202 may halt processing and take no further action if all of the identified transitions and/or segments are not successfully retrieved.

At 244, once all of the identified transitions and segments are obtained, the content intelligence service 202 may publish the segments to content catalog service 206. Content catalog service 206 may be configured to manage access of audio content with respect to one or more users. In some embodiments, content catalog service 206 may be a digital rights management system.

At 246, content intelligence service 202 may be configured to generate and store playlist 248. In some embodiments, playlist 248 may be generated in according with the data specified in playlist metadata 236. Alternatively, playlist 248 may be generated by content generation service 204 and provided to content intelligence service 202 at 236 in lieu of the playlist metadata 236. In some embodiments, the playlist 248 may include any suitable portion of the playlist metadata 236. In some embodiments, playlist 248 may be formatted according to a markup or object notation language (e.g., XML, JSON, etc.) before being persisted in storage.

Figure 3:
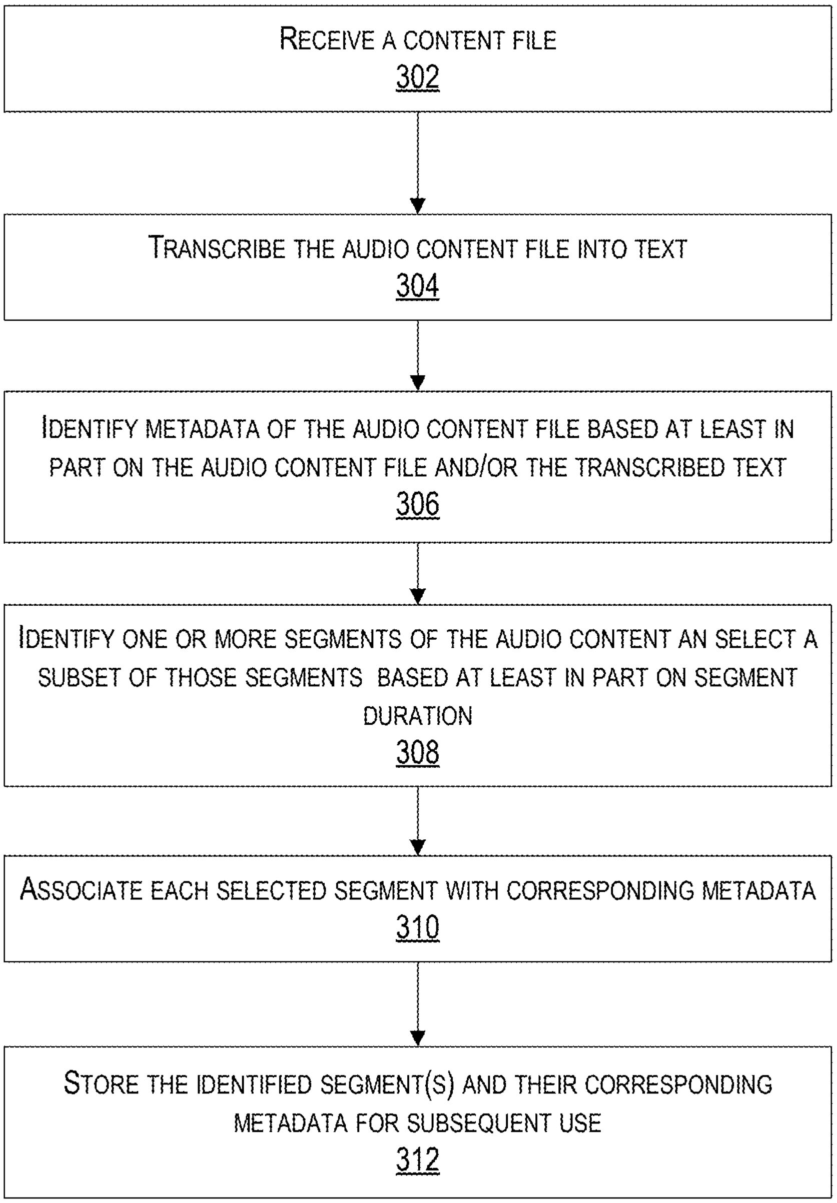
FIG. 3 is a block diagram illustrating exemplary method for generating one or more audio content segments from an audio content file, in accordance with at least one embodiment.

FIG. 3 is a block diagram illustrating an exemplary method 300 for generating one or more audio content segments (e.g., audio content segments 112 of FIG. 1) from an audio content file (e.g., audio content 114 of FIG. 1), in accordance with at least one embodiment. The method 300 may be performed by service provider computer(s) 102 of FIG. 1 which may be configured to provide any suitable combination of the computing components discussed in connection with FIG. 2. The method 300 may include more or fewer operations than those depicted in FIG. 3 and the operations of method 300 can be performed in any suitable order.

Method 300 may begin at 302, where a content file (e.g., an audio content file, a video content file, etc.) may be received (e.g., by the content generation service 204 of FIG. 2). "Audio content," or an "audio content file," as used herein, is intended to refer to audio files of at least a threshold duration (e.g., 10 minutes or longer, 15 minutes or longer, etc.) and/or original content from which one or more audio segments can be derived/identified. Examples of audio content can include, but are not limited to, podcasts, Internet radio/radio shows, audiobooks, audio blogs, streamed audio, and the like. "Video content," as used herein, is intended to refer to video files having at least a threshold duration (e.g., 10 minutes or longer, 15 minutes or longer, etc.) and/or original content from which one or more video segments (also referred to herein as "video content segments") can be derived/identified. Examples of video content may include, but are not limited to, video recorded lectures, video-based interviews, video-based radio shows, movies, television shows, streamed video, and the like. In some embodiments, such content may be received (e.g., from content intelligence service 202 of FIG. 2) or obtained from a data store configured to store content and that is accessible to the service provider computer(s) 102, such as content data store 108 of FIG. 1.

At 304, operations may be performed (e.g., by the content generation service 204) to transcribe the content file using any suitable audio-to-text/speech-to-text techniques. For example, an automatic speech recognition ("ASR") technique may be utilized to transcribe the audio of the content to text. ASR is a machine-learning or artificial intelligence technology using any suitable combination of traditional Hidden Markov Models, Gaussian Mixture Models, lexicon models, acoustic models, language models, and/or end-to-end deep learning models that have been previously trained to produce transcripts from audio. In some embodiments, diarization techniques may be employed along with the aforementioned transcription techniques to segment audio recordings into distinct segments based on identifying the speaker. Matching these segments to the corresponding portions of the transcription enables the speaker(s) to be identified or otherwise labeled within the transcription. In some embodiments, the content and/or the text may be analyzed using machine learning and/or natural language processing technique to generate punctuation (e.g., periods, commas, exclamation points, question marks, colons, etc.) in the transcribed text.

At 306, operations may be performed (e.g., by the content generation service 204) to identify or otherwise extract or derive metadata of the content file based at least in part on the content file and/or the transcribed text. By way of example, when the content is audio content, any suitable number of keywords, phrases, topics, semantic relations, and/or entities may be identified from the audio content and/or the transcription. In some embodiments, machine learning and/or one or more neural networks may be used extract audio features from the audio content, which may be analyzed to identify pauses, vocal volume, vocal pitch, vocal timber, vocal emotion, vocal emphasis, vocal patterns, musical interludes, and the like. When the content is video content, additional metadata may be derived such as lighting, contrast, transitions, visual elements/objects, or the like.

At 308, one or more segments may be identified and a subset of those segments may be selected based at least in part on segment duration. Segments identification may be performed using the metadata extracted at 306 to identify segments that occur between long pauses, or based on musical interludes, or the like. When the content is a video, segments may be identified based at least in part on scene transitions and the like. In some embodiments, text segmentation techniques may utilize the extracted data (e.g., keywords, phrases, topics, and the like) to divide the transcription into semantically coherent and contiguous segments. In some embodiments, segmentation may include segmenting the audio content into topics, subtopics, sentences, phrases, or the like. Phrases and/or sentences that share common words or topics may be combined (e.g., when the phrases and/or sentences are identified as being semantically similar using natural language processing techniques). In some embodiments, the content file may be received with metadata identifying segments start times and end times with which segments may be generated. A subset of the identified segments may be selected. In some embodiments, segments may be selected based at least in part on segment duration. By way of example, predefined rules may specify a threshold duration that a segment is to meet or exceed to be selected. An example threshold may be three minutes. Using this threshold, segments which are three minutes or longer may be selected from the segments identified. As another example, segments which are determined through natural language processing techniques to have a natural start and end may be selected. In some embodiments, segments may be selected when they meet both a duration requirement and are also determined to have a natural start and end. Identifying a natural start and end may include identifying pauses that exceed a predefined duration, identifying musical interludes and/or advertisements, identifying clapping or other audience participation, analyzing keywords to identify words generally associated with starting or ending a discussion, or any suitable combination of the above.

At 310, each of the selected segments may be associated with corresponding metadata. By way of example, a portion of the transcribed text may be associated with a selected segment. Additionally, or alternatively, any suitable combination of the metadata identified/extracted at 306 may be associated with a selected segment, including but not limited to speaker identifiers, audio features, keywords, topics, subtopics, or the like.

At 312, the selected segment(s) and their corresponding metadata may be stored for subsequent use (e.g., in segment data store 310 of FIG. 3).

Figure 4:
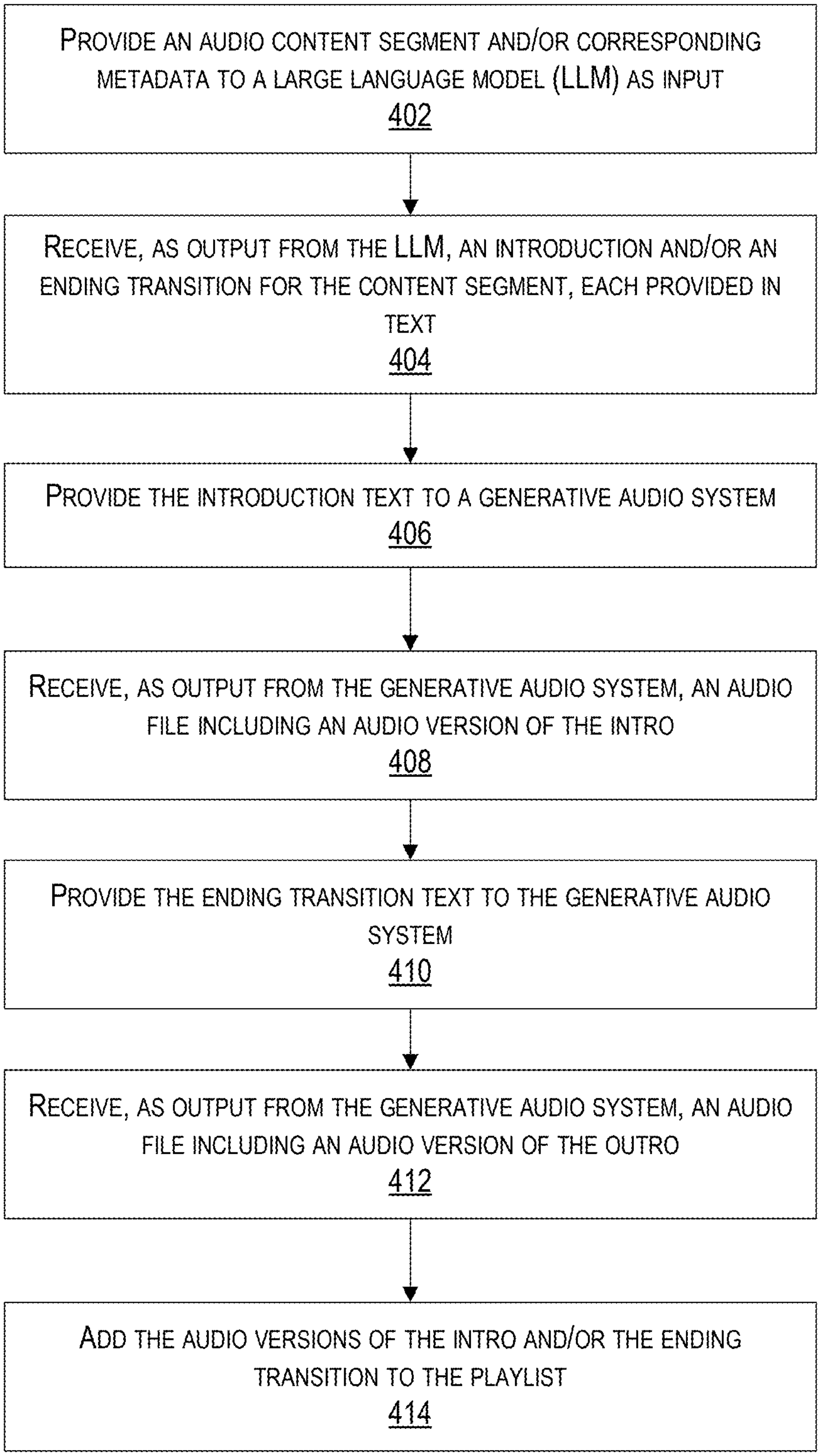
FIG. 4 is a block diagram illustrating exemplary method for generating one or more assets for an audio content segment with which an audio content segment playlist may be augmented, in accordance with at least one embodiment.

FIG. 4 is a block diagram illustrating exemplary method 400 for generating one or more assets for a content segment (e.g., a audio content segment, a video content segment, etc.) with whicha content segment playlist may be augmented, in accordance with at least one embodiment. The one or more assets may include any suitable transition that introduces and/or summarizes a segment such as segment introductions and/or ending transitions. In some embodiments, the asset may include audio and/or video. In some embodiments, a segment introduction identifies any suitable combination of the source of the segment (e.g., the source of the content file from which the segment was generated), the speakers within the segment, and/or one or more topics of the segment. For example, a segment introduction may include the text "Up next! An interview with Robert Downey Junior where he shares some the challenges that he faced playing Iron Man." An ending transition may be generated to include any suitable combination of the source of the segment and instructions for accessing related content (e.g., the source of the content file, additional segments related to the same topic, or the like). By way of example, a segment's ending transition may include the text "You just heard a part of Robert Downey Junior's interview with Radio Station A. Visit Radio Station A's page to access the full interview."

Method 400 may begin at 402, where an content segment and/or its corresponding metadata may be provided to a large language model (e.g., LLM 120 of FIG. 1) as input. A "large language model" (LLM), is intended to refer to any suitable deep learning algorithm (e.g., recurrent neural networks, convolutional neural networks, etc.) that can perform various natural language processing (NLP) tasks. LLMs may be trained with large datasets, enabling them to recognize, translate, predict, or generate text or other content in a variety of contexts. Some example LLMs include Titan Text G1 Express, Titan Text G1 Lite, Claude, Claude Instant, Jurassic-2 Mid, Jurassic-2 Ultra, Command, Command Light, Llama 2 Chat 13B, Llama 2 Chat 70B, etc. An LLM can be used to perfom any suitable natual language processing task or natural language generation task. In some embodiments, an LLM may be provided keywords, phrases, speaker identifiers, sentences, a transcription of the audio content segment, a segment or content file title, a segment or content file description, and/or any suitable metadata associated with the content segment. The LLM may be provided a prompt with the input data that directs the LLM to generate an introduction and/or an ending transition based on the input data.

At 404, output may be received from the LLM. The output may include an introduction and/or an ending transition for the content segment. Both the introduction and the ending transition may be provided in text. It should be appreciated, however, that while an LLM is utilized in the current example, in some embodiments, the introduction and the ending transition may be generated by a different model. In some embodiments, the model producing the introduction and/or the ending transition may be configured to produce output including an audio file that includes the introduction and/or the ending transition, rather than textual output. This model may take audio and/or text as input. Therefore, in some embodiments, audio input may be provided to such a model and audio output including the introduction and/or the ending transition for a segment and/or for a playlist may be received. In these embodiments, method 400 may proceed to 414.

At 406, if an introduction text was generated by the LLM, it may be provided as input to a generative system (e.g., generation system 124 of FIG. 1). The generative system may be configured to generate vocal output (and/or video output) from text using any suitable technique including, but not limited to, text-to-speech models/system, voice generators, voice narration software, video generation, or the like. If no introduction text was generated by the LLM, the method 400 may proceed to 410.

At 408, output may be received from the generative system. The output may be an audio file (or a video file) that includes an audio version of the introduction generated by the system from the text provided at 406. Audio output is provided as a non-limiting example, in some embodiments, the generative system may be utilized to produce a video introduction. In some embodiments, the video produced by such a system may include audio (e.g., music and/or vocal output). The video may be combined with any suitable asset (e.g., music and/or vocal output) to generate an introduction for a segment and/or playlist.

If an ending transition was generated by the LLM, it may be provided as input to a generative audio system at 410. If no ending transition text was generated by the LLM, the method 400 may proceed to 414. Otherwise, the method 400 may proceed to 412.

At 412, output may be received from the generative audio system. The output may be an audio file that includes an audio version of the ending transition that was generated by the system from the text provided at 410. As discussed above, the generative system may be utilized to produce a video ending transition which may, or may not, include audio (e.g., music and/or vocal output). The video may be combined with any suitable asset (e.g., music and/or vocal output) to generate an ending transition for a segment and/or playlist.

At 414, the audio versions of the introduction and/or the ending transition may be added to the playlist. In some embodiments, adding these audio files (or video files) to the playlist may include adding corresponding file identifiers and/or storage locations to playlist metadata (e.g., playlist metadata 236 of FIG. 2). In some embodiments, these identifiers may be added to a mapping, or another ordered list, such that the audio file of the introduction is played immediately before the segment it introduces and the ending transition is played immediately following the segment to which it corresponds.

Although not depicted in FIG. 4, similar techniques may be employed to generate one or more assets (e.g., playlist introductions, playlist ending transitions, etc.) for the playlist as a whole. In some embodiments, a playlist introduction may identify any suitable combination of a common topic or category of the segments of the playlist, a playlist title, a playlist description or summary, or the like. An example playlist introduction may include the text "Get ready to hear all about Marvel Movies! We've collected a variety of short segments we think you'll like. So, sit back and enjoy your dynamically curated content and remember, you can skip forward or go backward in the playlist at any time!" An ending transition may be generated to include any suitable combination the playlist title and instructions for accessing/obtaining future playlist content. An example ending transition for a playlist may include the text "That's all for now. Thanks for listening and we hope you are enjoying your dynamic playlist. Come back tomorrow for new content about Marvel Movies!" To generate playlist assets, the segments and their corresponding metadata may be provided as input to an LLM which may generate an introduction and/or an ending transition for the playlist. As similarly described above, this text may be provided to an audio generation system to generate an audio including vocals which provide the introduction and/or ending transition for the playlist.

Although not depicted in FIG. 4, it should be appreciated that additional assets such as a musical asset (e.g., an audio file including music) may be utilized with or without any suitable introduction and/or ending transitions of a segment and/or a playlist described above. In some embodiments, a musical asset may be combined with the introduction(s)/ending transition(s) described above. By way of example, a musical asset may be combined with an introduction and/or ending transition of a segment and/or playlist to provide background music to the introduction or ending transition. In some embodiments, the music to be combined with the introduction and/or ending transition may be user specified (e.g., selected by a user via a predefined set of songs, musical interludes, or the like). In some embodiments, the music to be combined with the introduction/ending transition may be selected by the system based at least in part on metadata associated with the audio file including the musical asset. As another example, a machine-learning model may be trained to identify a classification for a musical asset. In some embodiments, the classification may correspond to a mood, a theme, a genre, or any suitable attribute and/or label identified for the musical asset. The machine-learning model may be trained via supervised learning and a training data set with musical assets for which classifications are known. Another machine-learning model may be trained to classify a segment for which the introduction and/or ending transition is to be generated. As discussed similarly above, this classification may correspond to a mood, a theme, a genre, or any suitable attribute and/or label identified for the segment. This machine-learning model may be trained via supervised learning and a training data set with segments for which classifications are known.

Once trained, these models may be used to identify a classification for a musical asset and a classification for a segment. These classifications can be used to match a musical asset to a segment such that, if matched, the musical asset may be provided with the text to the audio generation system (or with the audio segment and/or its associated metadata to a system or model configured to generate audio introductions and/or ending transitions) and used as background music in the introduction and/or ending transition generated by that system. In some embodiments, the audio generation system may be configured to layer the musical asset and the introduction and/or ending transition such that the musical asset plays for a predefined amount of time (and/or a predefined number of phrases, measures, etc.) before the vocals providing the introduction and/or ending transition are played. In some embodiments, the audio generation system may further be configured to cause the musical asset to cease playing at the same time, or after the vocals providing the introduction and/or the ending transition are played.

Figure 5:
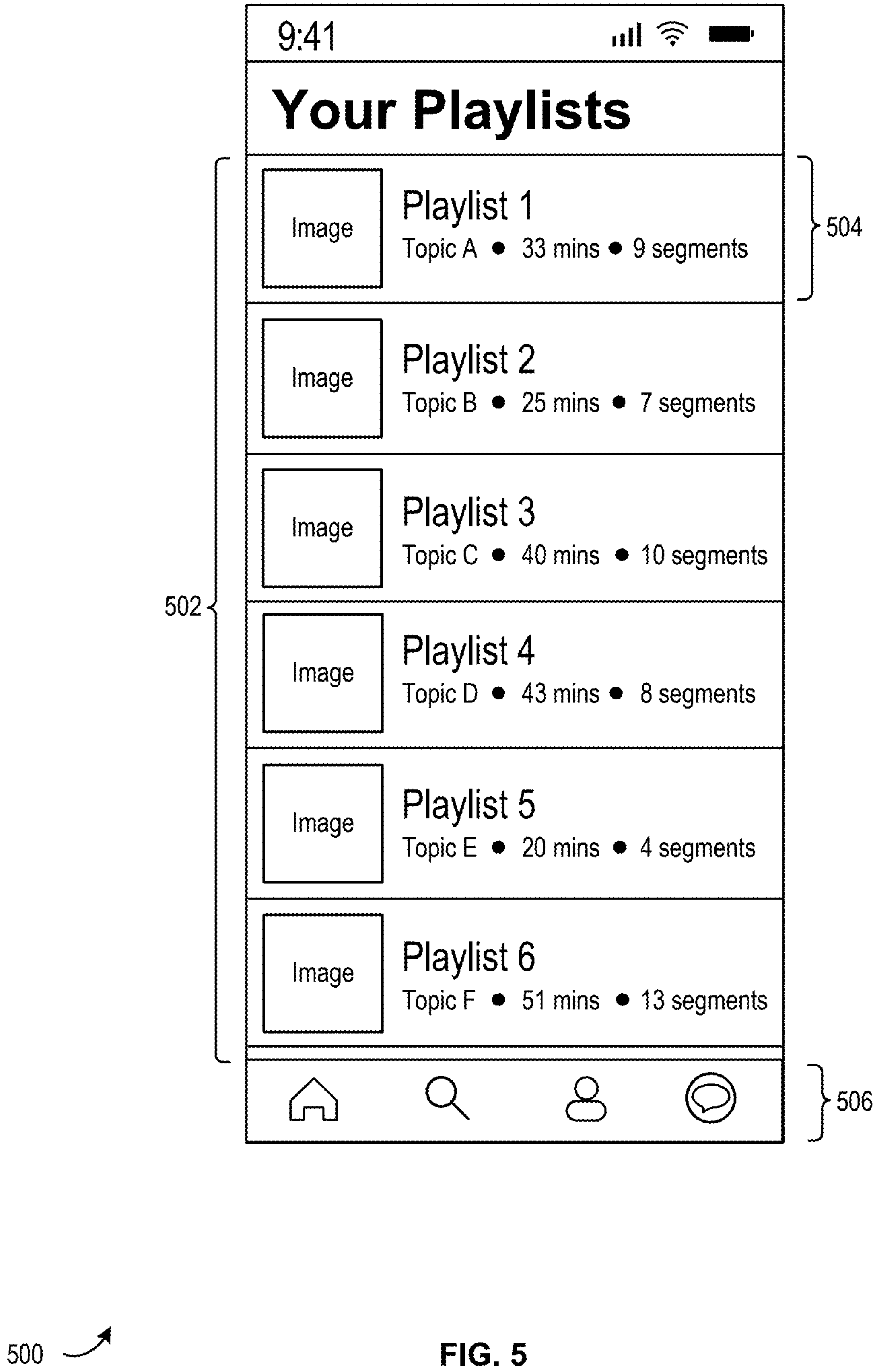
FIG. 5 is an example user interface configured to present one or more audio content segment playlists, in accordance with at least one embodiment.

FIG. 5 is an example user interface 500 configured to present one or more audio content segment playlists, in accordance with at least one embodiment. It should be appreciated that user interface 500 is provided for illustration and is not intended to limit the scope of this disclosure. Playlists and/or playlist metadata may be differently presented than depicted in FIG. 5.

User interface 500 may include area 502 in which any suitable number of playlists may be presented. Each playlist (e.g., playlist 1, depicted with area 504) may be presented with any suitable playlist metadata such as a playlist title (e.g., "Playlist 1"), a playlist topic (e.g., a topic with which each segment in the playlist is associated), a playlist duration (e.g., corresponding to a total runtime for the segments of the playlist), a number of segments that are included in the playlist (e.g., 9 segments), and any suitable asset corresponding to the playlist. In some embodiments, an image may be associated with the playlist. The image may be one of a number of pre-generated images and may be associated with various topics and/or categories. An image may be selected for a playlist based at least in part on any suitable combination of playlist metadata. By way of example, the image within area 504 may be selected based on its association with topic A, which is also associated with the playlist and its corresponding segments.

The area 502 may be scrollable such that the user may view any suitable number of playlists. Although not depicted in FIG. 5, the playlists may be grouped or otherwise separated based on any suitable portion of playlist metadata. By way of example, playlists may be grouped according to time, where playlists having a total duration of 20 minutes or less may be grouped together within area 502, while playlists having a total duration greater than 20 minutes may be provided in a separate portion of area 502.

The user interface 500 may be provided via any suitable webpage or application (e.g., a music application executing at a mobile device). In some embodiments, navigation options 506 may be provided for navigating within the webpage or application. In some embodiments, receiving user input indicating a selection of one of the playlists may cause navigation to the user interface 600 of FIG. 6.

Figure 6:
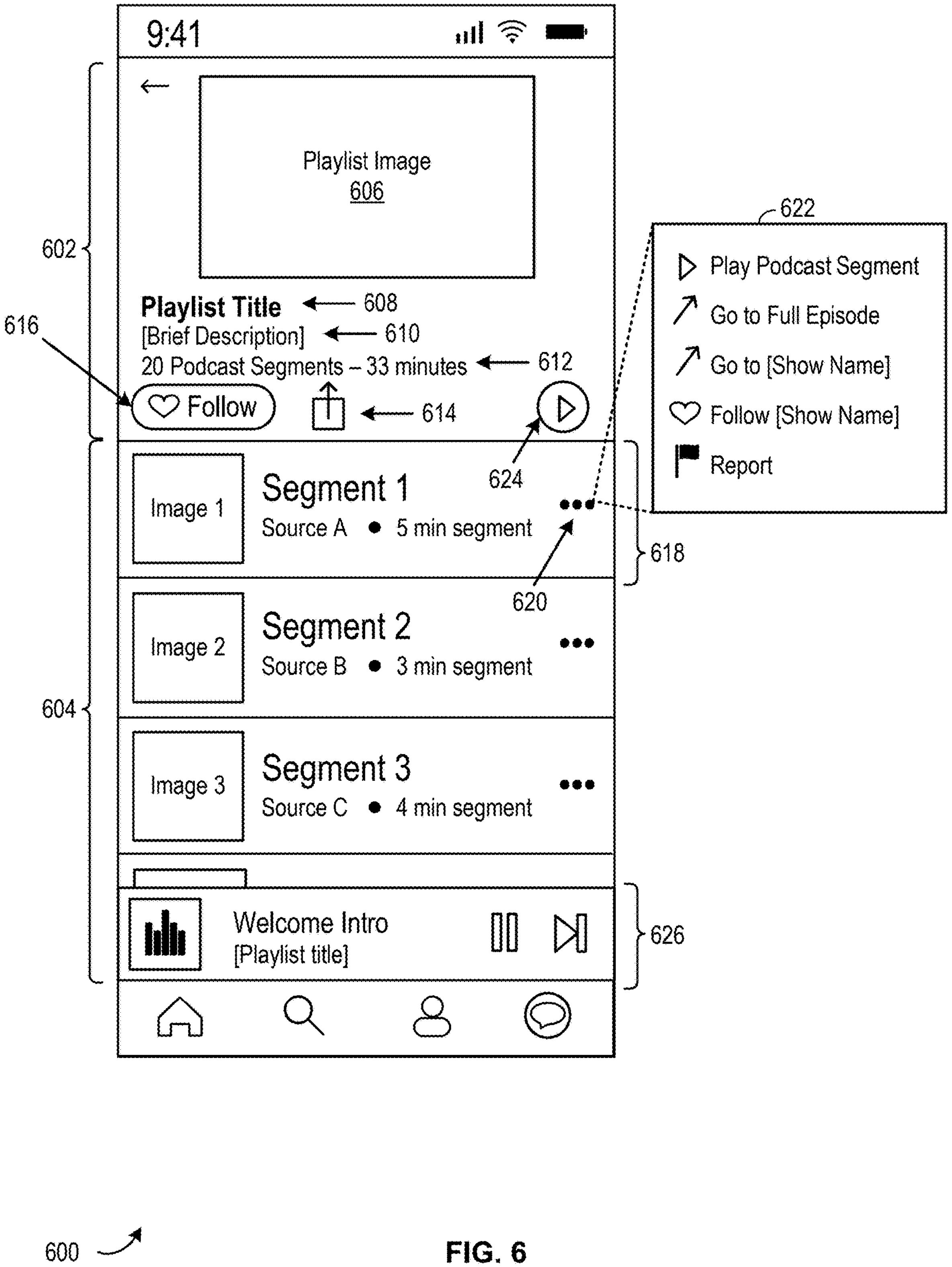
FIG. 6 is an example user interface for interacting with an audio content segment playlist, in accordance with at least one embodiment.

FIG. 6 is an example user interface 600 for interacting with an audio content segment playlist, in accordance with at least one embodiment. User interface 600 may include area 602 and area 604. Area 602 may be configured to present any suitable playlist asset and/or metadata. By way of example, area 602 may include any suitable combination of playlist image 606 (an example of the image of area 504 of FIG. 5), playlist title 608, playlist description 610, segment metadata 612 (e.g., including but not limited to a number of segments included in the playlist and/or a total duration associated with the playlist, or the like. In some embodiments, area 602 may include a share option 614 that, if selected, enables the user to select one or more other users (e.g., from a contacts list, etc.) and/or to provide contact information for one or more other users with which the playlist is to be shared. Playlist metadata may be transmitted to the selected/identified users and once accessed, those users may likewise access the playlist on their own device. In some embodiments, area 602 may include option 616 which may enable the user to "follow" the playlist. In some embodiments (e.g., when the playlist is associated with a topic or category such as "popular podcasts"), the playlist content may be periodically updated. The user may receive a notification when the content of the playlist is updated based at least in part on their selection of option 616. In some embodiments, followed playlist identifiers may be stored as part of an account or user profile associated with the user in order to track which playlist updates the user is interested in receiving.

Area 604 may present any suitable number of segments of the playlist. In some embodiments, area 604 may be scrollable to enable the user to view all of the segment metadata associated with the playlist at will. Area 618 may be configured to present segment metadata associated with one segment of the playlist. As depicted in FIG. 6, area 618 may present a segment title or other suitable identifier (e.g., "Segment 1"), a source of the audio content from which the segment was derived (e.g., "Source A"), a segment duration (e.g., 5 minutes), any suitable asset such as image 1, or the like.

Each area dedicated to a particular segment (e.g., area 618) may include an option (e.g., option 620) that, when selected, causes menu 622 to appear. Menu 622 may be provided as a popup and overlaid atop user interface 600 but is provide to the side for illustrative purposes. The menu 622 may include any suitable menu options such as an option to play the segment, an option to navigate to the full episode (e.g., a page at which the audio content from which the segment was derived may be accessed), an option to navigate to a page associated with the source of the segment (e.g., a page dedicated to a show from which segment 1 was derived), an option to follow the source of the segment (e.g., to receive updates and/or notifications when the source posts subsequent content), and/or an option to report the segment (e.g., as having inappropriate or offensive content). Using the option provided in menu 622, a user may opt to play a segment directly. In some embodiments, this may include playing the introduction and/or an ending transition corresponding to the segment, or playback may include the segment alone.

User interface 600 may include playback option 624 that, when selected, causes playback of the playlist in its entirety to commence. Selecting playback option 624 may cause a playlist introduction to begin playing, which may shortly transition to a segment introduction corresponding to segment 1, followed by the playback of segment 1, potentially followed by an ending transition corresponding to segment 1. Introductions, segments, and corresponding ending transitions may be played in an order corresponding to the order in which the segments of the playlist are listed.

During playback, area 626 may be presented at the position depicted in FIG. 6 or at any suitable location within user interface 600 to indicate playback information. As depicted, a welcome introduction associated with the playlist is currently playing. Playback options (e.g., pause and skip forward) may be provided as depicted in area 626, enabling the use to pause or skip to the next segment. Skipping to the next segment may cause the introduction corresponding to that segment to begin playback in use cases in which the segment is associated with an introduction.

Figure 7:
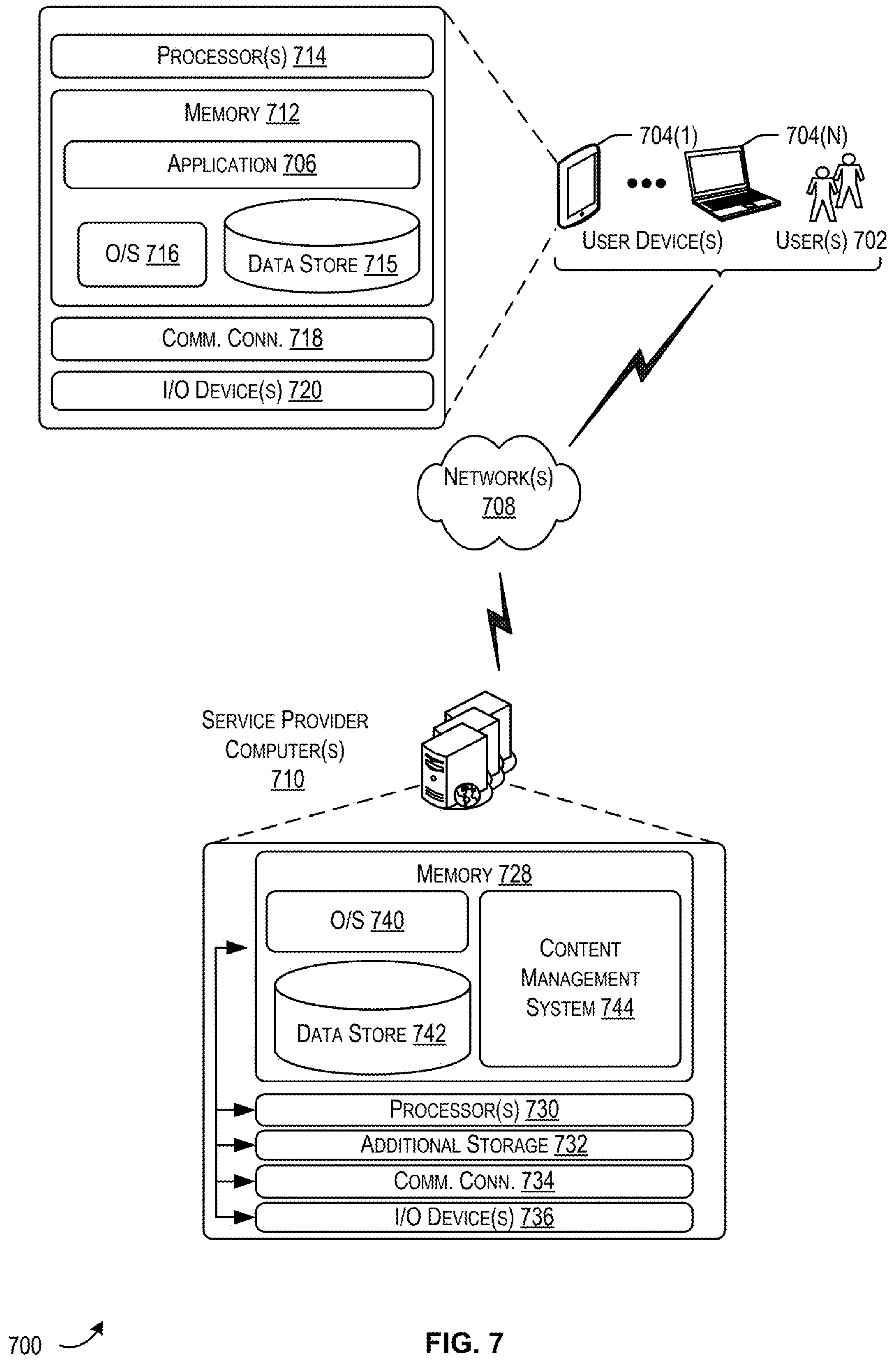
FIG. 7 illustrates components of a system, including a content management system that may perform functions, in accordance with at least one embodiment.

FIG. 7 illustrates components of a system 700, including a content management system 744, in accordance with at least one embodiment. In system 700, one or more user(s) 702 may utilize a user device (e.g., an example of user device 104 of FIG. 1, a user device of a collection of user device(s) 704(1)-(N) (collectively, user device(s) 704). For example, the user(s) 702 may access a user interface (e.g., user interface 500 of FIG. 5, user interface 600 of FIG. 6) accessible through an application 706 (e.g., a web browser, an application configured to render user interfaces provided by the content management system 744, a music application, or the like) running on the user device(s) 704 via one or more networks 708. In some embodiments, the application 706 operating on the user device(s) 704 may provide content that can be hosted, managed, and/or provided by a computing resources service or service provider, such as by utilizing one or more service provider computer(s) 710 (e.g., examples of the service provider computer(s) 102 of FIG. 1 and 218 of FIG. 2). The user(s) 702 may be provided various graphical user interface elements such as those described in connection to the figures above. In some embodiments, user input provided via these user interfaces may be transmitted by the application 706 to the content management system 744, implemented by service provider computer(s) 710.

In some examples, the networks 708 may include any one or a combination of many different types of networks, such as cable networks, the Internet, wireless networks, cellular networks, and other private and/or public networks. While the illustrated example represents the user(s) 702 accessing application functionality over the networks 708, the described techniques may equally apply in instances where the user(s) 702 interact with the service provider computer (s) 710 via the one or more user device(s) 704 over a landline phone, via a kiosk, or in any other suitable manner. It should be appreciated that the described techniques may apply in other client/server arrangements, as well as in non-client/server arrangements (e.g., locally stored applications, etc.).

The service provider computer(s) 710, perhaps arranged in a cluster of servers or as a server farm, may host the application 706 operating on the user device(s) 704 and/or cloud-based software services. Other server architectures may also be used to host the application 706 and/or cloud-based software services. The application 706 (e.g., a shopping application, a web browser, etc.) operating on the user device(s) 704 may be capable of handling requests from the user(s) 702 and serving, in response, various user interfaces that can be rendered at the user device(s) 704. The application 706 operating on the user device(s) 704 can present any suitable type of interface that supports user interaction, including video chat session, video/audio playback, real-time or prerecorded presentation of video and/or audio, or the like.

The user device(s) 704 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 704 may be in communication with the service provider computer(s) 710 via the networks 708, or via other network connections.

In one illustrative configuration, the user device(s) 704 may include at least one memory 712 and one or more processing units (e.g., processor(s) 714). The processor(s) 714 may be implemented as appropriate in hardware, computer-executable instructions, firmware, or combinations thereof. Computer-executable instruction or firmware implementations of the processor(s) 714 may include computer-executable or machine-executable instructions written in any suitable programming language to perform the various functions described.

The memory 712 may store program instructions that are loadable and executable on the processor(s) 714, as well as data generated during the execution of these programs. Depending on the configuration and type of user computing device, the memory 712 may be volatile (such as random-access memory (RAM)) and/or non-volatile (such as read-only memory (ROM), flash memory, etc.). The user device (s) 704 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 712 may include multiple different types of memory, such as static random-access memory (SRAM), dynamic random-access memory (DRAM), or ROM.

Turning to the contents of the memory 712 in more detail, the memory 712 may include an operating system 716, one or more data stores 715, and one or more application programs, modules, or services for implementing the techniques disclosed herein, provided via the application 706. The application 706 may be configured to receive, store, and/or display a network page or other interface for interacting with the service provider computer(s) 710. Additionally, the memory 712 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 704 may also contain communications connection(s) 718 that allow the user device(s) 704 to communicate with a stored database, another computing device or server (e.g., the service provider computer(s) 710), user terminals and/or other devices on the networks 708. The user device(s) 704 may also include I/O device(s) 720, such as a keyboard, a mouse, a pen, a voice input device, a touch input device, a display, speakers, a printer, etc.

In some embodiments, the service provider computer(s) 710 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 710 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 710 may be in communication with the user device(s) 704 and/or other service providers via the networks 708 or via other network connections. The service provider computer(s) 710 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 710 may include at least one memory 728 and one or more processing units (e.g., processor(s) 730). The processor(s) 730 may be implemented as appropriate in hardware, computer-executable instructions, firmware, or combinations thereof. Computer-executable instruction or firmware implementations of the processor(s) 730 may include computer-executable or machine-executable instructions written in any suitable programming language to perform the various functions described.

The memory 728 may store program instructions that are loadable and executable on the processor(s) 730, as well as data generated during the execution of these programs. Depending on the configuration and type of service provider computer(s) 710, the memory 728 may be volatile (such as RAM) and/or non-volatile (such as ROM, flash memory, etc.). The service provider computer(s) 710 or servers may also include additional storage 732, which may include removable storage and/or non-removable storage. The additional storage 732 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 728 may include multiple different types of memory, such as SRAM, DRAM, or ROM.

The memory 728, the additional storage 732, both removable and non-removable, are all examples of computer-readable storage media. For example, computer-readable storage media may include volatile, or non-volatile, removable or non-removable media implemented in any method or technology for storage of information such as computer-readable instructions, data structures, program modules, or other data. The memory 728 and the additional storage 732 are all examples of computer storage media. Additional types of computer storage media that may be present in the service provider computer(s) 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 710. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 710 may also contain communications connection(s) 734 that allow the service provider computer(s) 710 to communicate with a stored database, another computing device or server, user terminals and/or other devices on the networks 708. The service provider computer(s) 710 may also include I/O device(s) 736, such as a keyboard, a mouse, a pen, a voice input device, a touch input device, a display, speakers, a printer, etc.

Turning to the contents of the memory 728 in more detail, the memory 728 may include an operating system 740, one or more data stores 742, and/or one or more application programs, modules, or services (e.g., the content management system 744) for implementing the features disclosed herein. Content management system 744 may be configured to perform the operations discussed above in connection with FIGS. 1-6. By way of example, content management system 744 process audio content in the manner discussed in connection with FIGS. 1-4 to generate audio content segments and corresponding assets (e.g., introductions, ending transitions) that may be played back via user interface 600 of FIG. 6. It should be appreciated that any suitable portion of the functionality of content management system 744 may be provided, in whole or in part, at user device(s) 704 (e.g., as part of application 706). In some embodiments, the application 706 may host user interfaces 500 of FIG. 5 and 600 of FIG. 6, while the remaining operations discussed in connection with FIGS. 1-5 may be provided by content management system 744. In other embodiments, some or all of the functionality discussed in connection with FIGS. 1-5 may be provided at the user device(s) 704.

Figure 8:
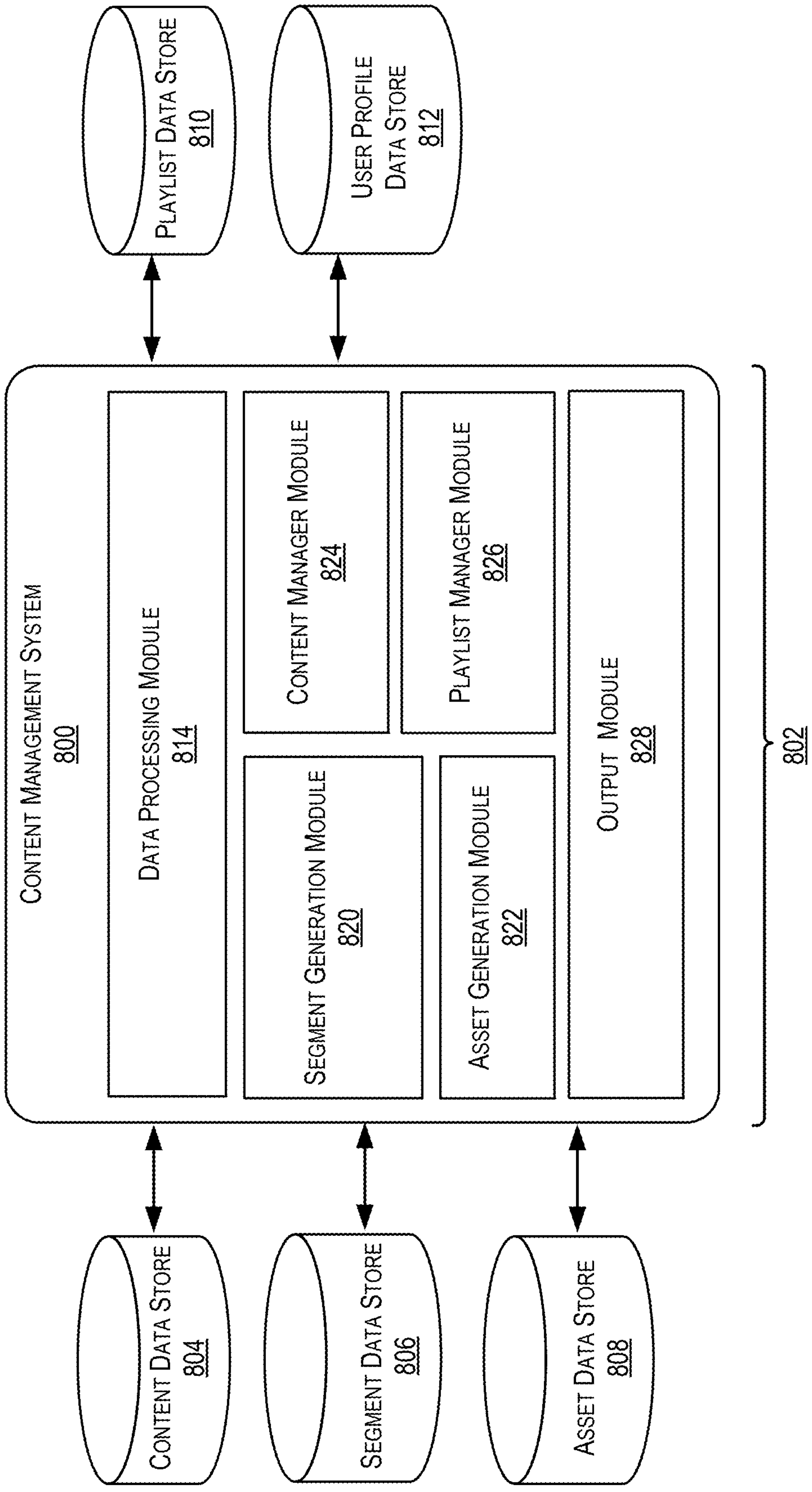
FIG. 8 is a schematic diagram of an example computer architecture for content management system, including a plurality of modules that may perform functions in accordance with at least one embodiment.

FIG. 8 is a schematic diagram of an example computer architecture for content management system 800 (e.g., the content management system 744 of FIG. 7), including a plurality of modules 802 that may perform functions in accordance with at least one embodiment. In content management system 800 may be configured to support the processes, methods, operations, and techniques described above in connection with FIGS. 1-7. The modules 802 may be software modules, hardware modules, or a combination thereof. If the modules are software modules, the modules can be embodied on a computer readable medium and processed by a processor in any of the computer systems described herein. It should be noted that any module or data store described herein, may be, in some embodiments, be a service responsible for providing functionality corresponding to the module described below. The modules 802 may be execute as part of the content management system 800, or the modules 802 may exist as separate modules or services external to the content management system 800. In some embodiments, the modules 802 may be executed by the same or different computing devices, as a service, as an application, or the like. In some embodiments, any suitable combination of the modules 802 may provide any suitable combination of the functionality of the computing components discussed in connection with FIG. 2.

In the embodiment shown in the FIG. 8, data stores accessible to the content management system 800 may include content data store 804 (e.g., content data store 106 of FIG. 1), segment data store 806 (e.g., segment data store 210 of FIG. 2), asset data store 808 (e.g., asset data store 212 of FIG. 2), playlist data store 810, and user profile data store 812, are shown, although data can be maintained, derived, or otherwise accessed from various data stores, either remote or local to the content management system 800, to achieve the functions described herein. The content management system 800, as shown in FIG. 8, includes various modules such as a data processing module 814, segment generation module 820, asset generation module 822, content manager module 824, playlist manager module 826, and output module 828. Some functions of the modules 814-828 are described below. However, for the benefit of the reader, a brief, non-limiting description of each of the modules is provided in the following paragraphs. In accordance with at least one embodiment, a process validating existence of an anomaly and/or for identifying a source of an anomaly is provided.

Data processing module 814 may be configured to receive any suitable data related to processing requests for content and/or asset generation, content playback, or playlist management functions. By way of example, data processing module 814 may be configured to receive a content generation request. A content generation request may include or identify content from which one or more segments may be generated. In some embodiments, a content generation request may include any suitable query or attribute with which content may be identified for processing. As a non-limiting example, a content request may request that segments may be generated from a particular audio content file, or from audio content files that are associated with a particular topic (e.g., the planet Mars, Marvel Movies, or the like). Data processing module 814 may be configured to retrieve content identified in the request, or to search for content using the query and/or attribute(s) provided in the request, in content data store 804. Data processing module 814 may pass the content and/or content identifiers, query, or attributes provided in the request to the segment generation module 820. In some embodiments, content generation requests may be machine-generated based on predefined rules and/or schedules or by user input (e.g., based on user input provided by human curators via interface 208 of FIG. 2).

In some embodiments, segment generation module 820 may be configured to provide at least a portion of the functionality described above in connection with the content generation service 204 of FIG. 2. This may include performing any suitable operations associated with the method 300 of FIG. 3 to generate one or more segments from audio content and/or to generate and/or extract segment metadata as described in FIG. 3. The segment generation module 820 may generate any suitable number of segments from the content identified or provided in the data received from data processing module 814. As described above, segment generation module 820 may be configured to discard, or refrain from generating altogether, segments that do not meet a predefined criteria (e.g., at least 3 minutes in duration, having a natural start and end, etc.). Once generated, segment metadata may be associated with the segment and the segment and segment metadata may be stored in segment data store 806 by the segment generation module 820 for subsequent use.

The functionality of asset generation module 822 may be triggered by segment generation module 820 at any suitable time. Asset generation module 822 may be configured to generate any suitable asset for an audio content segment. By way of example, asset generation module 822 may be configured to perform the operations discussed above in connection with method 400 of FIG. 4. Asset generation module 822 may access any suitable large language model and/or audio generation system to generate introductions and/or ending transitions to playlists and/or segments and to convert those textual assets to audio as described in FIG. 4. Once generated, the assets may be stored in asset data store 808 by asset generation module 822.

In some embodiments, the playlist manager module 826 may be configured to generate a playlist from the one or more segments stored in segment data store 806 and/or segments provided by segment generation module. The functionality of playlist manager module 826 may be invoked at any suitable time, according to any suitable stimuli, periodically, according to a predefined schedule, or the like. By way of example, playback manager module 826 may be configured to generate a number of playlists corresponding to one or more predefined or user-defined topics. As a non-limiting example, a predefined list of topics may include the planet Mars. Using this topic as a search query, the playlist manager module 826 may search segment data store 806 for segments that are associated with segment metadata that includes the keyword “Mars.” Segments (e.g., segments with “Mars” in the title, or as an associated topic, or the like) may be selected. Assets corresponding to the selected segments may be retrieved by asset data store 808 or, in some embodiments, the functionality of the asset generation module 822 may be invoked by the playlist manager module 826 to generate assets for the selected segments.

In some embodiments, playlist manager module 826 may be configured to update or replace previously generated playlists as new content becomes available, according to a predefined schedule or periodicity, or at any suitable time. Playlists and/or segments may be published to the content manager module 824. Playlist metadata may be persisted in playlist data store 810. In embodiments in which playlists may be updated with new content, the playlist manager module 826 may retrieve the playlist from playlist data store 810 in order to effectuate such modifications.

Segments and/or playlist metadata may be provided to content manager module 824 which may provide the functionality of content catalog service 206 of FIG. 2. Content manager module 824 may be configured to enable access to segments and/or playlists at an application operating on a user device.

Output module 828 may be configured to transmit any suitable data to user interfaces and/or other systems (e.g., application 706 of FIG. 7) to enable user interaction with content management system 800.

In some embodiments, users may select or otherwise specify various topics, audio sources, speakers, and/or categories in which they are interested. Identifiers for these topics, sources, speakers, and categories may be stored in user profile datastore 812. Selecting or specifying such data may be one manner in which the functionality of content management system 800 may be invoked. Storing these identifiers as being associated with a user profile in user profile data store 812 may enable the content management system (e.g., the playlist manager module 826 and/or the output module 828) to cause any suitable notification (e.g., an email, a push notification, a text message or the like) to be presented at user devices that are associated with or used to access user profiles. For example, a notification may be provided to users when a new playlist is created that matches a topic, source, speaker, or category that is associated with that user’s profile. As another example, a notification may be provided when a playlist that was previously followed by a user (for which an association may be maintained in their user profile) has been updated with new content. This enables the discovery of new content without requiring additional user interaction after the topic, source, speaker, or category is associated with the user’s profile.

In some embodiments, the playlist manager module 826 may be configured to utilize historical viewing data of a particular user or any suitable number of users to determine playlists to generate and/or to surface to particular users. Topics, sources, speakers, and categories may be related to one another. The content management system 800 may be configured to determine, based on a user viewing a particular playlist associated with a particular topic, source, speaker, or categories, that the user is likely to be interested in playlists that are similar or relate to that topic, source, speaker, or categories and may cause the content manager module 824 to surface those related playlists to the user. In some embodiments, users that are similar to a particular user (e.g., based at least in part on viewing history or any suitable data stored in corresponding user profiles) and may identify playlists in which the similar users have shown interest or viewed and may surface those playlists to the particular user at any suitable time. These techniques enable the content management system 800 to increase the likelihood that the user will be presented content in which they have interest while reducing the need for the user to perform their own search.

Figure 9:
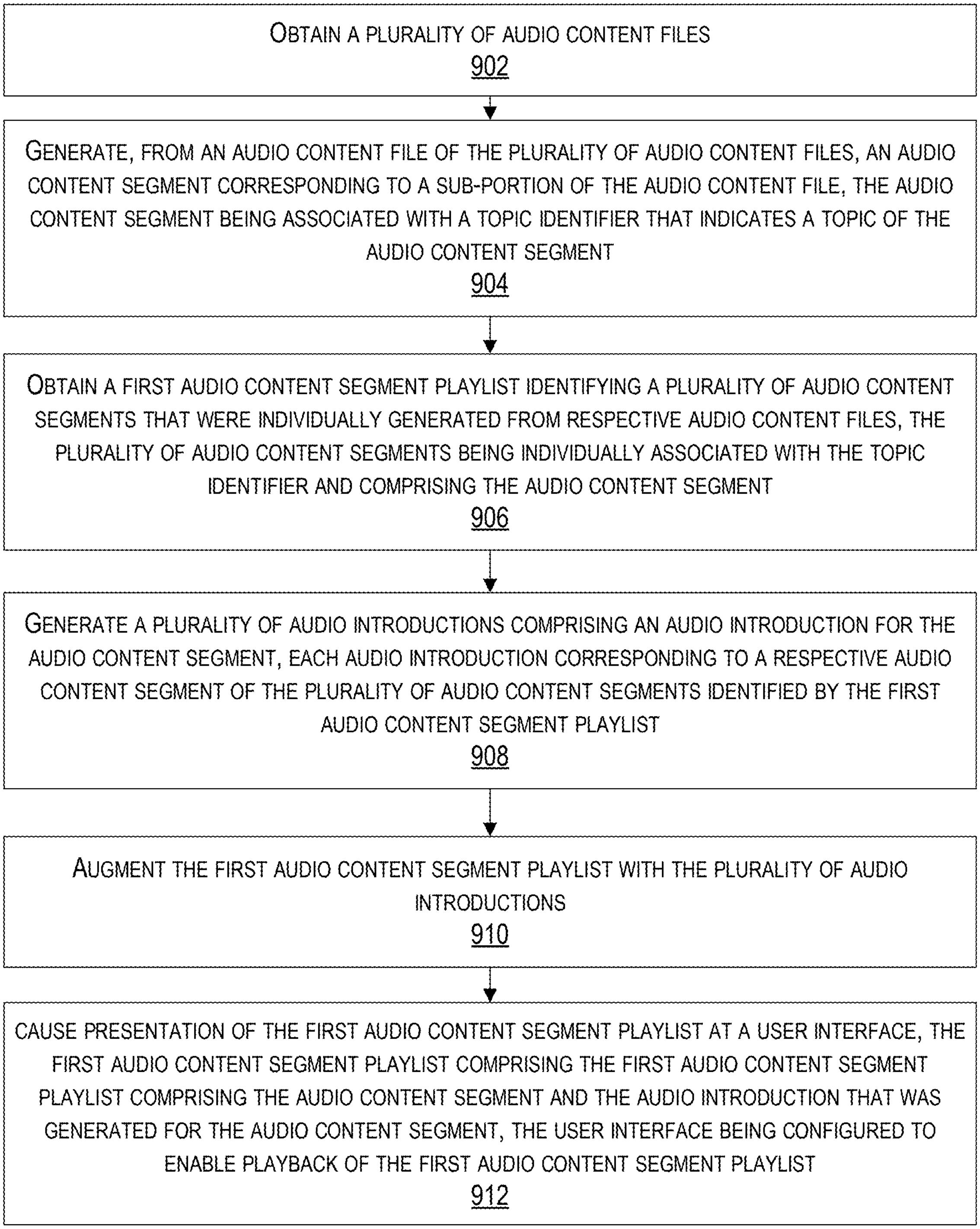
FIG. 9 is a flowchart illustrating an example method for generating and providing access to an audio content segment playlist, in accordance with at least one embodiment.

FIG. 9 is a flowchart illustrating an example method 900 for generating and providing access to an audio content segment playlist, in accordance with at least one embodiment. One or more computing devices (e.g., service provider computer(s) 102 and/or 710 of FIGS. 1 and 7, respectively) each comprising one or more processors and one or more computer-readable mediums (e.g., one or more memories) may be utilized. A computer-readable medium may store computer-executable instructions that, when executed by at least one processor, causes the computing device(s) (e.g., the computing components of FIG. 2, implementing the content management system 744 of FIG. 7, etc.) to perform instructions comprising the operations of the method 900. It should be appreciated that the operations of the method 900 may be performed in any suitable, not necessarily the order depicted in FIG. 9. Further, the method 900 may include additional, or fewer operations than those depicted in FIG. 9. In some embodiments, the operations of method 900 may be performed by any suitable combination of the user device(s) 704 of FIG. 7 and/or the service provider computer(s) 710 of FIG. 7.

The method 900 may begin at 902, where a plurality of audio content files (e.g., audio content 114 of FIG. 1) may be obtained (e.g., from content data store 106 of FIG. 1). In some embodiments, the plurality of audio content files may include any suitable combination of podcasts, Internet radio/radio shows, audiobooks, audio blogs, streamed audio, and the like.

At 904, an audio content segment (e.g., audio segments 112 of FIG. 1) may be generated (e.g., by the content generation service 204 of FIG. 2, by the segment generation module 820 of FIG. 8, etc.). In some embodiments, the audio content segment may correspond to a sub-portion of the audio content file. In some embodiments, the method 300 of FIG. 3 may be executed to generate the audio content segment. In some embodiments, the audio content segment may be associated with a topic identifier (e.g., an identifier specific to a topic). The topic identifier may indicate a topic of the audio content segment.

At 906, a first audio content segment playlist may be obtained. In some embodiments, the first audio content segment playlist may be generated (e.g., based on user input, by the system) as described in connection with FIG. 2. The first audio content segment playlist may be generated by any suitable component (e.g., content generation service 204, playlist manager module 826 of FIG. 8, etc.). The first audio content segment playlist may identify a plurality of audio content segments (e.g., by segment identifier that uniquely identify the segment) that were individually generated from the respective audio content files. In some embodiments, the plurality of audio content segments may be individually associated with the topic identifier may comprise the audio content segment.

At 908, a plurality of audio introductions comprising an audio introduction for the audio content segment may be generated (e.g., by the content generation service 204, by the asset generation module 822 of FIG. 8, etc.). In some embodiments, each audio introduction may correspond to a respective audio content segment of the plurality of audio content segments identified by the first audio content segment playlist. Method 400 of FIG. 4 discussed an example method for generating these audio introductions in more detail.

At 910, the first audio content segment playlist may be augmented with the plurality of audio introductions. In some embodiments, the first audio content segment playlist may be associated with a mapping or other suitable ordered list that identifies an order of playback for the introduction and segments of the first audio content segment playlist. In embodiments in which ending transitions for segments and/or a playlist introduction/ending transition are utilized, the mapping/ordered list may identify an order for any suitable combination of the content (e.g., all introductions, segments, and ending transitions) included in the first audio content segment playlist.

At 912, operations may be executed (e.g., by the catalog manager service 206 of FIG. 2), by the playlist manager module 826, by the output module 828 of FIG. 8, etc.) to cause presentation of the first audio content segment playlist at a user interface (e.g., the user interface 500 of FIG. 5, the user interface 600 of FIG. 6). In some embodiments, the first audio content segment playlist comprises the audio content segment and the audio introduction that was generated for the audio content segment. The user interface may be configured to enable playback of the first audio content segment playlist (e.g., via option 624 of FIG. 6, via an option of menu 622 of FIG. 6, etc.).

Figure 10:
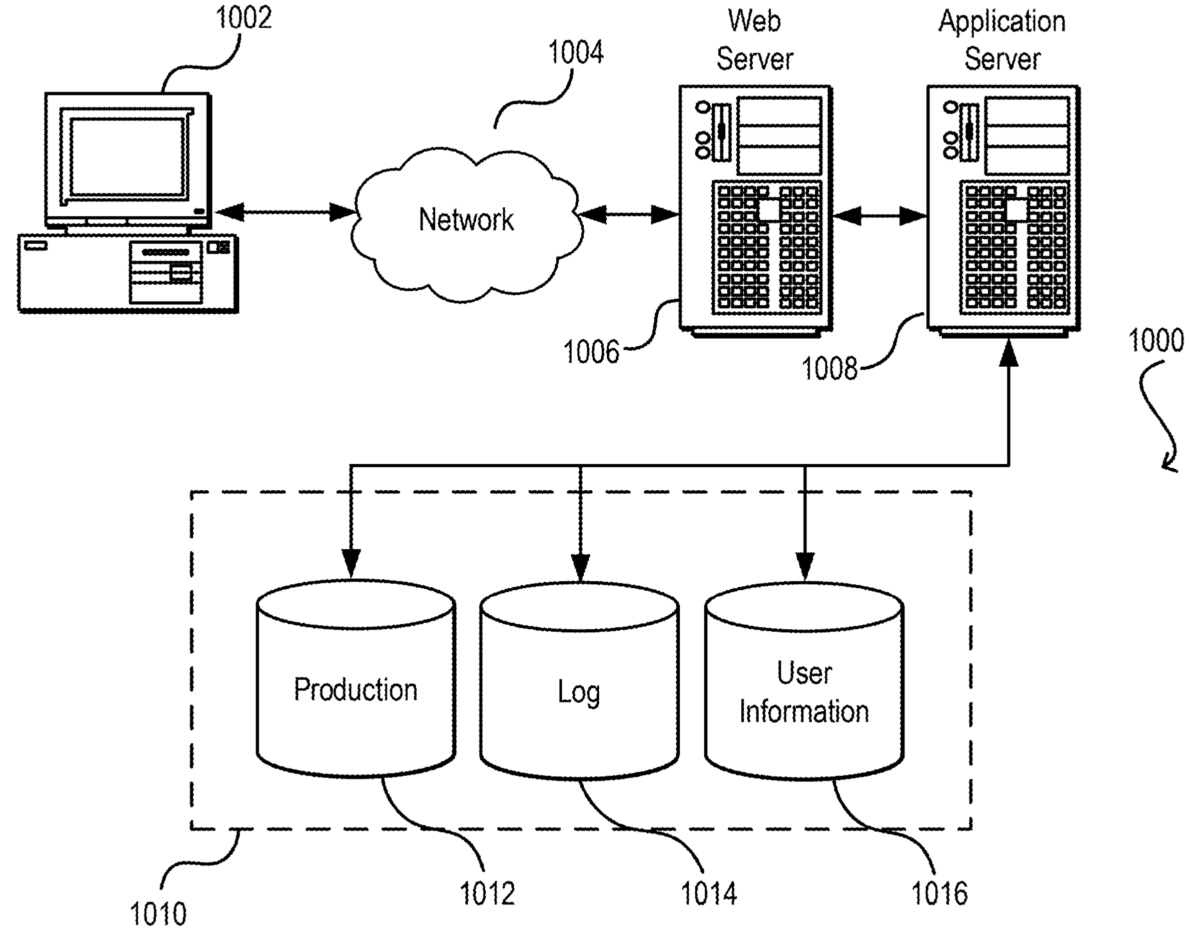
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes a user device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Webpage that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

obtaining, by a content management system, a plurality of audio content files;

generating, by the content management system from an audio content file of the plurality of audio content files, an audio content segment corresponding to a sub-portion of the audio content file;

indexing, by the content management system, the audio content segment with respective metadata comprising a topic identifier that indicates a topic of the audio content segment;

identifying, by the content management system, a plurality of audio content segments from a data store for a first audio content segment playlist based at least in part on executing a search query against the data store of metadata instances;

generating, by the content management system, a plurality of audio introductions comprising an audio introduction for the audio content segment, a respective audio introduction of the plurality of audio introductions being generated based at least in part on generating a natural language introduction for a respective audio content segment of the plurality of audio content segments, at least a portion of the natural language introduction comprising language that differs from that provided by the audio content segment and a corresponding metadata instance;

augmenting, by the content management system, the first audio content segment playlist with the plurality of audio introductions; and causing, by the content management system, presentation of the first audio content segment playlist at a user interface, the first audio content segment playlist comprising the audio content segment and the audio introduction that was generated for the audio content segment, the user interface being configured to enable playback of the first audio content segment playlist.

2. The computer-implemented method of claim 1, further comprising:

automatically obtaining, by the content management system, a second audio content segment playlist identifying a second plurality of audio content segments that are individually associated with the topic identifier, the second plurality of audio content segments being different from the plurality of audio content segments identified by the first audio content segment playlist;

generating, by the content management system, a second plurality of audio introductions, each audio introduction of the second plurality of audio introductions corresponding to a particular audio content segment of the second plurality of audio content segments identified by the second audio content segment playlist;

augmenting, by the content management system, the second audio content segment playlist with the second plurality of audio introductions; and causing, by the content management system, presentation of the second audio content segment playlist to replace the presentation of the first audio content segment playlist at the user interface.

3. The computer-implemented method of claim 1, further comprising:

executing a first process for obtaining the plurality of audio content segments identified by the first audio content segment playlist; and executing a second process for obtaining assets for each of the plurality of audio content segments, the assets comprising at least the plurality of audio introductions.

4. The computer-implemented method of claim 3, wherein the first process and the second process are performed concurrently.

5. The computer-implemented method of claim 1, wherein generating the respective audio introduction of the plurality of audio introductions comprises:

providing, to a large language model, a prompt that comprises a transcription and segment metadata associated with the audio content segment, the large language model being configured to perform a natural language generation task that generates a textual introduction for the audio content segment that describes the audio content segment and includes the language that differs from the transcription and the segment metadata;

receiving, from the large language model, output comprising the textual introduction that was generated by the large language model for the audio content segment, the textual introduction comprising a reference to at least one attribute associated with the audio content segment, the at least one attribute being a title, a description, one or more speaker identifiers, or a source of the audio content segment;

providing the textual introduction to a generative audio system as input, the generative audio system being configured to generate vocal output that presents the textual introduction audibly; and receiving an audio file comprising the vocal output that presents the textual introduction for the audio content segment audibly, the audio file being the audio introduction for the audio content segment.

6. The computer-implemented method of claim 5, further comprising inserting the audio introduction in a position within the first audio content segment playlist that immediately precedes the audio content segment to which it corresponds.

7. The computer-implemented method of claim 1, wherein the audio introduction for the audio content segment audibly identifies at least one attribute of the corresponding metadata instance, the at least one attribute being a title of the audio content file from which the audio content segment was generated, a description of the audio content segment, a source of the audio content segment, or one or more speakers in the audio content segment.

8. A content management system, comprising:

one or more processors; and one or more memories storing computer-executable instructions that, when executed by the one or more processors, cause the one or more processors to:

identify a content segment within a content file, the content segment being associated with a segment attribute;

index the content segment with a metadata instance comprising the segment attribute;

identify a plurality of content segments based at least in part on executing a query related to the segment attribute against a data store of metadata instances comprising the metadata instance;

generate an audio introduction for the content segment or for a content segment playlist, the audio introduction being generated based at least in part on generating a natural language introduction comprising language that differs from that provided by the content segment and the metadata instance corresponding to the content segment;

generate the content segment playlist identifying the plurality of content segments, the content segment playlist comprising the content segment and the audio introduction that was generated for the content segment or for the content segment playlist; and cause, by the content management system, presentation of the content segment playlist at a user interface, the user interface comprising options for playing the plurality of content segments of the content segment playlist.

9. The content management system of claim 8, wherein the audio introduction is generated for the content segment, and wherein generating the audio introduction for the content segment comprises:

providing, in a prompt, the content segment and the metadata instance to a large language model, the prompt being used to direct the large language model to generate a corresponding textual introduction based on the content segment and the metadata instance, the corresponding textual introduction describing the content segment and including the language that differs from that provided in the content segment and the metadata instance;

receiving, as output from the large language model, text corresponding to the audio introduction, the text comprising at least one attribute associated with the content segment, the at least one attribute being a title, a description, one or more speaker identifiers, or a source of the content segment;

providing the text as input to a generative audio system, the generative audio system being previously configured to generate audible speech from textual input; and receiving the audio introduction as second output from the generative audio system, the audio introduction being an audible version of the text.

10. The content management system of claim 8, wherein the content segment is identified from the content file based at least in part on exceeding a threshold duration and including a natural start and end.

11. The content management system of claim 8, wherein executing the computer-executable instructions further cause the one or more processors to generate an ending transition for the content segment based at least in part on 1) providing the content segment and the metadata instance to a large language model, 2) receiving a textual version of the ending transition from the large language model, and 3) converting the textual version of the ending transition to audible speech.

12. The content management system of claim 8, wherein the audio introduction is for the content segment playlist, and wherein the audio introduction for the content segment playlist is generated based at least in part on 1) providing collective metadata associated with the plurality of content segments to a large language model, 2) receiving text from the large language model, and 3) converting the text to an audio file.

13. The content management system of claim 12, wherein the content file is an audio content file or a video content file.

14. The content management system of claim 8, wherein the segment attribute indicates a topic discussed within the content segment.

15. A non-transitory computer-readable storage medium comprising computer-executable instructions that, when executed by one or more processors, cause the one or more processors to:

derive an audio content segment of a corresponding audio content file;

index the audio content segment with a metadata instance comprising a topic identifier;

identify a plurality of audio content segments based at least in part on executing a query related to the topic identifier against a data store of metadata instances corresponding to a collection of audio content segments;

generate an audio introduction for the audio content segment, the audio introduction being generated based at least in part on generating a natural language introduction comprising language that differs from that provided by the audio content segment and the metadata instance corresponding to the audio content segment;

generate an audio content segment playlist identifying the plurality of audio content segments, the audio content segment playlist comprising the audio content segment and the audio introduction that was generated for the audio content segment;

cause presentation of the audio content segment playlist at a user interface, the user interface comprising options for playing the plurality of audio content segments of the audio content segment playlist; and according to a predefined schedule, automatically update the audio content segment playlist with one or more additional audio content segments.

16. The non-transitory computer-readable storage medium of claim 15, wherein executing the computer-executable instructions further causes the one or more processors to transmit a notification that the one or more additional audio content segments have been added to the audio content segment playlist.

17. The non-transitory computer-readable storage medium of claim 15, wherein executing the computer-executable instructions further causes the one or more processors to:

generate an ending transition for the audio content segment; and generate playlist metadata that specifies an order of playback for the audio introduction for the audio content segment, the audio content segment, and the ending transition for the audio content segment.

18. The non-transitory computer-readable storage medium of claim 15, wherein executing the computer-executable instructions further causes the one or more processors to:

identify, from historical user profile data associated with a user, one or more topic identifiers related to previously viewed content, wherein presentation of the audio content segment playlist at the user interface is caused based at least in part on identifying an association between the topic identifier associated with the plurality of audio content segments of the audio content segment playlist and the one or more topic identifiers related to the previously viewed content.

19. The non-transitory computer-readable storage medium of claim 15, wherein executing the computer-executable instructions further causes the one or more processors to:

identify, from historical user profile data associated with a plurality of users, one or more topic identifiers related to previously viewed content, purchase history, or viewing history; and determine, based on user profile data associated with a particular user, a similarity between the particular user and the plurality of users, wherein presentation of the audio content segment playlist at the user interface is caused based at least in part on identifying the similarity.

20. The non-transitory computer-readable storage medium of claim 15, wherein executing the computer-executable instructions to dynamically update the audio content segment playlist with one or more additional audio content segments, further causes the one or more processors to:

independent of user input, identify newly available content comprising the one or more additional audio content segments, wherein each of the one or more additional audio content segments are associated with a respective metadata instance comprising the topic identifier;

generate a corresponding segment introduction for each of the one or more additional audio content segments; and append, to the audio content segment playlist, each of the one or more additional audio content segments and each corresponding introduction generated for the one or more additional audio content segments.

* * * * *